(12) United States Patent
Laabs et al.

(10) Patent No.: US 7,793,424 B2
(45) Date of Patent: Sep. 14, 2010

(54) POSITIONING DEVICE

(75) Inventors: Steffen Laabs, Jena (DE); Matthias Nowak, Jena (DE)

(73) Assignee: Trimble Jena GmbH, Jena (DE)

( * ) Notice: Subject to any disclaimer, the term of this patent is extended or adjusted under 35 U.S.C. 154(b) by 374 days.

(21) Appl. No.: 11/795,065

(22) PCT Filed: Jan. 12, 2005

(86) PCT No.: PCT/EP2005/000228

§ 371 (c)(1),
(2), (4) Date: Sep. 6, 2007

(87) PCT Pub. No.: WO2006/074695

PCT Pub. Date: Jul. 20, 2006

(65) Prior Publication Data

US 2008/0136267 A1    Jun. 12, 2008

(51) Int. Cl.
G01C 5/00    (2006.01)
(52) U.S. Cl. ........................................... 33/290
(58) Field of Classification Search ............... 33/290, 33/291, 292
See application file for complete search history.

(56) References Cited

U.S. PATENT DOCUMENTS

| | | | |
|---|---|---|---|
| 3,968,705 A * | 7/1976 | Amano et al. .............. | 74/89.38 |
| 4,528,607 A | 7/1985 | Thompson et al. | |
| 5,150,260 A | 9/1992 | Chigira et al. | |
| 5,177,638 A | 1/1993 | Emura et al. | |
| 5,214,970 A | 6/1993 | Vezain et al. | |
| 5,241,183 A | 8/1993 | Kanai et al. | |
| 5,622,737 A * | 4/1997 | Hehl .......................... | 425/590 |
| 5,638,222 A | 6/1997 | Shigehara et al. | |
| 5,731,918 A | 3/1998 | Parr-Burman et al. | |
| 5,815,325 A | 9/1998 | Johnson | |
| 6,240,626 B1 * | 6/2001 | Nghiem ....................... | 29/701 |
| 2002/0106205 A1 | 8/2002 | Kikuchi et al. | |
| 2002/0122665 A1 | 9/2002 | Suzuki | |
| 2004/0112704 A1 * | 6/2004 | McNeill et al. ............ | 192/53.1 |
| 2006/0249038 A1 * | 11/2006 | Futamura et al. ............ | 100/281 |

FOREIGN PATENT DOCUMENTS

DE    247493    7/1987
DE    62255907    11/1987

(Continued)

OTHER PUBLICATIONS

English language abstract of Japan Patent Publication No. JP 10268173, esp@cenet database, Oct. 9, 1998.

(Continued)

*Primary Examiner*—G. Bradley Bennett
(74) *Attorney, Agent, or Firm*—Cooper & Dunham LLP

(57) ABSTRACT

A positioning device comprises a frame (60); a motor (61) having a drive shaft; a spindle (63) having a first end (71) and a second end (76) and being rotatable in relation to the frame (60); a coupling (62) resiliently connecting said drive shaft to said first end (71) of said spindle (63) such that the spindle (63) rotates when the drive shaft of the motor (61) rotates; and a support assembly (72, 74, 75) elastically supporting at the frame (60) at least one of the second end (76) of the spindle (63) and the motor (61).

60 Claims, 14 Drawing Sheets

FOREIGN PATENT DOCUMENTS

| | | |
|---|---|---|
| DE | 69117435 | 10/1996 |
| DE | 10160587 | 6/2003 |
| GB | 897263 | 5/1962 |
| JP | 59019910 | 2/1984 |
| JP | 60010213 | 1/1985 |
| JP | 61231516 | 10/1986 |
| JP | 2020814 | 1/1990 |
| JP | 2266311 | 10/1990 |
| JP | 3288108 | 12/1991 |
| JP | 3294808 | 12/1991 |
| JP | 3294813 | 12/1991 |
| JP | 7151947 | 6/1995 |
| JP | 8184742 | 7/1996 |
| JP | 8194148 | 7/1996 |
| JP | 10268173 | 10/1998 |
| JP | 2000098210 | 4/2000 |
| JP | 2000214370 | 8/2000 |
| JP | 2001239886 | 9/2001 |

OTHER PUBLICATIONS

English language abstract of Japan Patent Publication No. JP 2020814, esp@cenet database, Jan. 24, 1990.

English language abstract of Japan Patent Publication No. JP 2001239886, esp@cenet database, Sep. 4, 2001.

English language abstract of Japan Patent Publication No. JP 2000214370, esp@cenet database, Aug. 4, 2000.

International Preliminary Report On Patentability for International Application No. PCT/EP2005/000228 including the Written Opinion Of The International Searching Authority issued Jan. 17, 2007.

English-language abstract of German Publication No. DE 10160587, published Jun. 12, 2003, esp@cenet database.

English-language abstract of Japan Publication No. JP 200098210, published Apr. 7, 2000, esp@cenet database.

English-language abstract of German Publication No. DE 69117435, published Oct. 24, 1996, esp@cenet database.

English-language abstract of Japan Publication No. JP 8194148, published Jul. 30, 1996, esp@cenet database.

English-language abstract of Japan Publication No. JP 8184742, published Jul. 16, 1996, esp@cenet database.

English-language abstract of Japan Publication No. JP 7151947, published Jun. 16, 1995, esp@cenet database.

English-language abstract of Japan Publication No. JP 3294813, published Dec. 26, 1991, esp@cenet database.

English-language abstract of Japan Publication No. JP 3294808, published Dec. 26, 1991, esp@cenet database.

English-language abstract of Japan Publication No. JP 3288108, published Dec. 18, 1991, esp@cenet database.

English-language abstract of Japan Publication No. JP 62255907, published Nov. 7, 1987, esp@cenet database.

English-language abstract of Japan Publication No. JP 247493, published Jul. 8, 1987, esp@cenet database.

English-language abstract of Japan Publication No. JP 61231516, published Oct. 15, 1986, esp@cenet database.

English-language abstract of Japan Publication No. JP 60010213, published Jan. 19, 1985, esp@cenet database.

English-language abstract of Japan Publication No. JP 59019910, published Feb. 1, 1984, esp@cenet database.

* cited by examiner

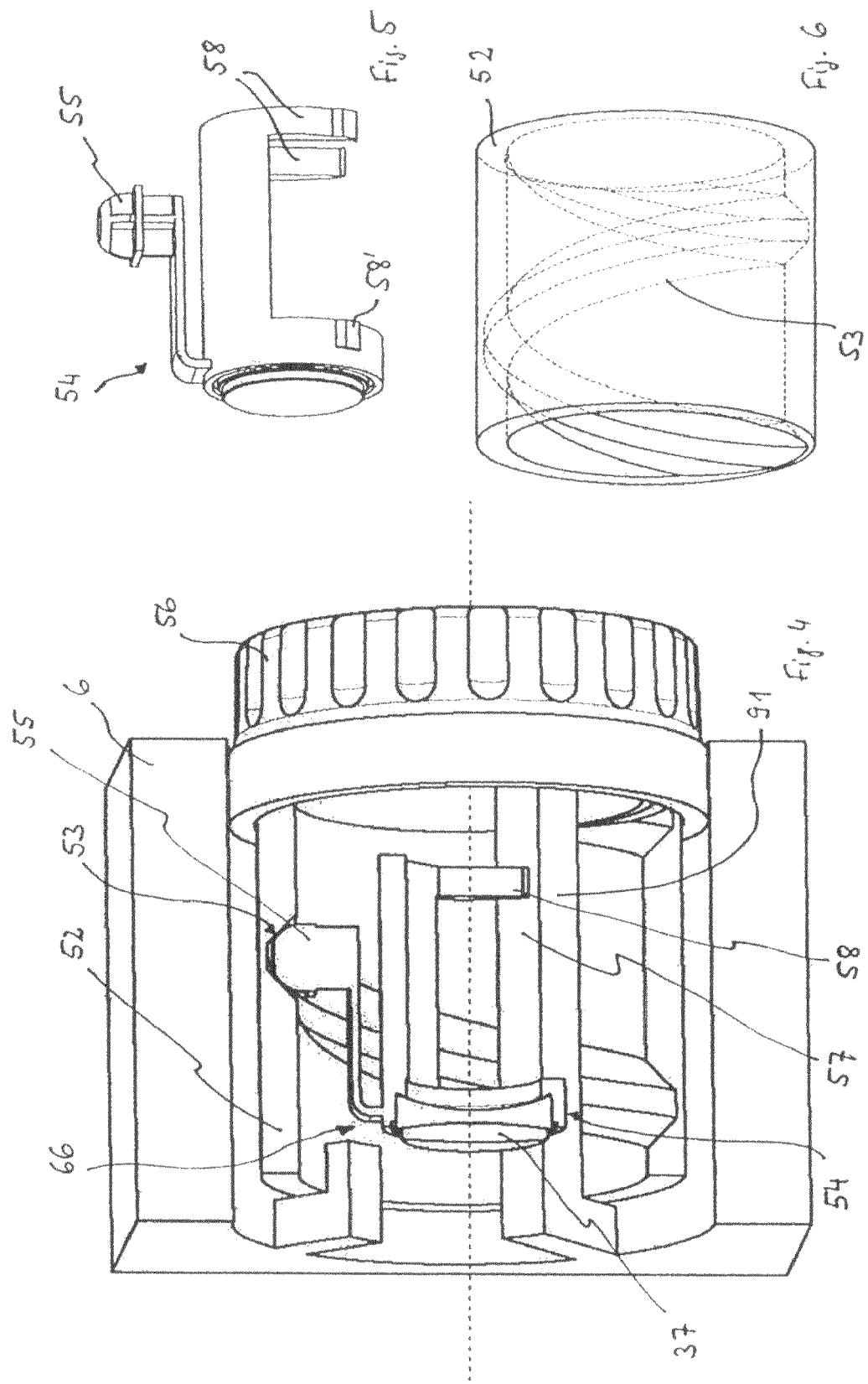

POSITIONING DEVICE

The invention relates to a positioning device, in particular to a positioning device for optical instruments, optical instruments equipped with such a positioning device, and, in particular, tachymeters.

In many cases, positioning devices serve the purpose of adjusting, in a controlled and precise manner, the position of a member to be positioned. Examples of such positioning devices include focusing drives or focus-adjusting devices, respectively, in optical instruments, by means of which a lens or lens system is moved along the optical axis of the lens, for example in order to focus the image during imaging of an object.

Such positioning devices are generally known and examples are disclosed for example in JP 62-255907, DE 691 17 435 T2, JP 3-288108 A, JP 8-184 742 A, JP 08-194 148 A, JP 7-151947, US 2002/0106205 A1, JP 2002214506 A, US 2002/0106205, WO 95/22778 A, DD 247 493, JP 61-231516 A, JP 62-255907, DE 691 17 435 T2 JP 3-294813 A, US 2002/0106205 A1 and JP 2000098210 A. At least some of these positioning devices use a relatively large number of parts.

An application of positioning devices for focusing devices in optical instruments such as cameras and microscopes requires a precise, backlash-free positioning if fast focusing shall be possible. If a positioning device is used in a device operated by a user, the positioning device should further create only little noise when positioning is effected.

Focusing devices are not only used in cameras and microscopes, but also in surveying instruments, specifically in so-called tachymeters, which comprise means for angle measurement and distance measurements and are then often referred to also as tacheometers or total stations. These tachymeters include a telescope by which the target whose distance or position, respectively, is to be determined is aimed at.

The telescopes of such tachymeters are provided, inter alia, with objectives which comprise focusing lenses or groups of focusing lenses for focusing, which are generally fixedly attached to a focusing lens tube, which can freely move inside a guide tube in axial direction, i.e. in the direction of the optical axis of the telescope. Surrounding the guide tube, which is fixedly attached to the housing of the device or is part of the housing, there is a grooved tube, which is freely rotatable about the optical axis and is provided with a groove that has a pitch along the length of the optical axis. The lens drive is operated manually by the viewer, by rotating the tube with the groove about the optical axis whereby a protrusion of the focusing lens tube engaging the groove follows the curve defined by the groove in the guide tube. A mechanism of the focusing lens tube for securing the focusing lens tube against rotation effects the conversion of the rotation of the tube having the groove into an axial movement of the focusing lens tube. This solution is complex, requires a lot of space in the telescope and does not allow a modular construction. Due to the relatively high torque required to adjust the focusing lens tube, this solution is hardly suitable for a motor drive.

It is a first object of the invention to provide a positioning device which can operate at a low-noise level.

It is a second object of the invention to provide a positioning device which allows easy transmission of a rotary movement of a motor, in a manner free from play and free from backlash, to a linear motion of a member which is to be positioned.

Moreover, it is a third object of the invention to provide a positioning device allowing precise guiding of a member, which is to be positioned, in an easy, backlash-free manner.

According to a first aspect of the invention a positioning device is provided, the positioning device comprising a frame; a motor having a drive shaft; a spindle having a first end and a second end and being rotatable in relation to the frame; a coupling resiliently connecting said drive shaft to said first end of said spindle such that the spindle rotates when the drive shaft of the motor rotates; and a support assembly elastically supporting at the frame at least one of the second end of the spindle and the motor.

In the positioning device according to the first aspect of the invention, the spindle, driven by the motor via the coupling, is provided for moving a body to be driven. This body may be the member to be positioned by the device or coupled to the member to be positioned. For this purpose, the spindle may comprise an outside engaging structure for engaging a complementary engaging structure of the body to be driven. The engaging structure may for example comprise at least one of a protrusion, a rib, a pin, a recess, a groove or a thread, the complementary engaging structure being suited to engage the engaging structure such that a rotation of the spindle can be transformed into a movement of the body.

The motor can be any type of motor, in particular an electromotor. For a simple and precise positioning the electromotor may be a stepping motor.

To reduce noise and in particular vibrations, the support assembly elastically supports at least one of the second end of the spindle and the motor and, at the same time, the coupling resiliently or elastically, respectively, connects the drive shaft of the motor and the spindle. This arrangement may in particular reduce noise due to a damping of vibrations and/or a partial decoupling of parts of the positioning device with respect to vibrations which decoupling may reduce the propagation of sound vibrations along the parts and also reduce possible resonances in the structure.

In order to be able to provide a very precise positioning of the member to be positioned, the coupling may connect the drive shaft of the motor and the first end of the spindle resiliently or elastically, respectively, such, that a rotation of the drive shaft is transmitted essentially backlash-free to the first end of the spindle. This can be achieved by using a suitable design of the coupling and in particular by a suitable choice of materials to be used. Preferably, the coupling also supports the spindle at the first end.

A positioning device according to the first aspect of the invention produces only little or low noise when the spindle is rotated by the motor due to the use of the coupling resiliently connecting the drive shaft of the motor and the spindle and the use of the support assembly elastically supporting at the frame at least one of the second end of the spindle and the motor.

To achieve low-noise operation of they positioning device, the support assembly may have vibrational damping properties. Preferably, vibrations in the audible frequency range are damped.

A simple construction of the positioning device is obtained, if the support assembly comprises an elastic bearing assembly, which support the second end of the spindle of the frame. In general, any elastic bearing assembly can be used. However, in order to obtain a simple modular construction, it is preferred, that the elastic bearing assembly comprises a bearing mounted at the frame and at least one elastic element arranged between the second and of the spindle and the bearing or between the bearing and the frame. Preferably, in first case, the second end of the spindle and the bearing and, in the second case, the bearing and the frame do not touch, but are separated by the at least one elastic element. Thus, a partial decoupling between the second end of the spindle and the bearing or between the bearing and the frame, respectively, may be obtained.

Generally, the elastic element can be provided in any suitable shape and in any suitable position with respect to the frame, the bearing and the second end of the spindle. Preferably, at least one section of the elastic element is clamped in an axial direction of the spindle. In particular, the elastic element may be clamped between an end face of the second end of the spindle and the bearing or between the bearing and the frame. This arrangement allows to mount the spindle in an essentially fixed position with respect to the frame and to achieve at the same time a damping of vibrations and/or at least a partial decoupling of the spindle and the frame for vibrations in the axial direction.

To restrict movements of the spindle in a radial direction, preferably at least one section of the elastic element is clamped in a radial direction of the spindle. In particular, the section of the elastic element may be clamped between the second end of the spindle and the bearing or the bearing and the frame.

The elastic member can be made of any suitable elastic material. To achieve good noise reduction, however, the elastic member is preferably made of an elastomeric material. As an elastomeric material in particular a suitable elastomer or thermoplastic elastomer can be used, for example. For instance, synthetic rubbers may be used.

In order to achieve a good noise reduction, preferably the elastic element damps vibrations in the audible frequency range. This can be achieved by a suitable choice of the elastomeric material and an appropriate shape of the elastic element.

Generally, it may be sufficient to use only one elastic element. In order to achieve good operating properties of the positioning device, however, preferably to or more elastic elements are arranged symmetrically with respect to spindle.

The elastic element may be an O-ring. The center of the O-ring may be concentric with the longitudinal axis of the spindle, so that the O-ring is arranged symmetrically with respect to the spindle. O-rings allow an easy assembly of the positioning device.

In particular, if only one elastic element shall be used, the elastic element may be of cup-shaped form. In particular, the elastic element may be formed such, that it may receive at least a section of the second end of the spindle or the bearing. This type of elastic element allows a particularly simple assembly of the positioning device.

As a further alternative, the elastic element may be a block. Preferably at least two blocks are used which are arranged symmetrically with respect to the spindle, so that the spindle is supported symmetrically.

If more than one elastic element is used in the positioning device, any combination of elastic elements may be used, in particular any combination of the three last mentioned types of elastic elements.

In order to reduce losses due to friction and to reduce corresponding noise, preferably the bearing is rolling bearing.

Generally, any coupling can be used to resiliently connect the first end of the spindle and the drive shaft of the motor which rigidly couples the drive shaft and the spindle with respect to rotations of the drive shaft. In order to achieve a resilient connection between the drive shaft and the first end of the spindle in simple manner, the coupling preferably comprises at least on elastic transmission element. In particular, the material properties and the shape of the elastic transmission element may be chosen such that a good noise-reduction is obtained. In order to achieve a good stability on the one hand and a good noise-reduction on the other hand, the elastic transition element may be made from a polymer material.

In order to allow a substantially back lash-free transmission of a rotation of the drive shaft of the motor to the spindle, the coupling preferably rigidly couples the drive shaft and the spindle with respect to rotation of the drive shaft and the coupling is connected to the spindle in such a manner that the spindle can be tilted with respect to an axis of rotation of the drive shaft.

A particularly simple design is obtained, when the spindle comprises a groove at the first end in a direction orthogonal to an axis of rotation of the spindle, the groove having sidewalls which are at least partially diverging, and when the coupling comprises one of pin or an edge connected to the elastic transmission element and engaging with the groove in a back lash-free manner. The use of the groove having at least partially diverging sidewalls in combination with a pin or edge coupled to the elastic transmission element allows a back lash-free rotation of the spindle in both rotation directions, in particular when the spindle is biased towards the motor by an elastic element of the support assembly at the second end of the spindle. If the groove having at least partially diverging sidewalls is a V-shaped groove it can be formed in the spindle in a particularly simple manner.

To obtain a simple construction of the coupling, the coupling preferably comprises a first coupling part rigidly connected to the drive shaft and second coupling part comprising the elastic transmission element and being connected to the spindle.

To allow a particularly simple assembly of the coupling, preferably the second coupling part is connected to the first coupling part by a form-fit or interlocked connection. A form-fit connection may in particular allow repairs because this kind of connection is preferably releasable. The form-fit or interlocked connection only needs to provide a rigid coupling with respect to rotations of the drive shaft, but not necessarily of translations along the longitudinal axis of the spindle. In particular, the first and the second coupling part can be formed such, that they can be plugged together along the longitudinal axis of the spindle. In this case, easy assembly may be possible, which requires no special tools.

Preferably the first coupling part comprises a square socket at its end facing the spindle. This square socket may be used to receive the elastic transmission element. A square socket allows not only a simple production of the first coupling part but also an essentially back lash-free transmission of a rotation of the drive shaft to the spindle.

The second coupling part may in particular comprises a pin on each end of which there is arranged an elastic O-ring or an elastic disk. The elastic O-ring or the elastic disk may in particular represent the above mentioned elastic transmission element. This design of the second coupling part may in particular allow the use of parts available also for other purposes which may reduce the cost for the positioning device.

Preferably, an O-ring or elastic disk and the elastic elements of the support assembly bias the drive shaft and the spindle towards each other. In particular, the biasing force may be substantially along the axis of the spindle, so that the pin or edge remains in contact with the walls of the groove even if a torque is applied to a drive shaft. In this way, the spindle is firmly held between the support assembly and the motor.

According to a second aspect of the invention a positioning device is provided, the positioning device comprising a positioned member; a rotatable spindle having an outside engaging structure; a body being movable along the spindle and having a complementary engaging structure engaging with the engaging structure of the spindle to transform a rotation of the spindle into a translation of the body when the body is secured from being rotated by the spindle; a securing element for securing the body from being rotated by the spindle; and an elastic coupling member exerting a torque to the body relative to the spindle and transmitting a movement of the body to the positioned member.

The positioning device according to a second aspect of the invention may comprise any of the features of the positioning device according to the first aspect of the invention, in particular the above mentioned features. Conversely, the positioning device according to the first aspect of the invention may further comprise a positioned member, a body being moveable along the spindle and having a complementary engaging structure engaging with engaging structure of the spindle to transform a rotation of the spindle into a translation of a body when the body is secured from being rotated by the spindle, a securing element for securing the body from being rotated by the spindle, and elastic coupling member exerting a torque to tilt the body relative to the spindle and transmitting a movement of the body to the positioned member.

In the positioning device according to the second aspect of the invention, a rotation of the spindle may be transformed into a linear movement of the body by means of the engaging structure of the spindle and the complementary engaging structure of the body engaging with engaging structure of the spindle as the securing element secures the body from being rotated by the spindle. The elastic coupling member has two functions: First, it is used to exert a torque to tilt the body relative to the spindle, in particular about an axis being approximately orthogonal to the spindle by means of an elastic force due to a deformation of the member. This tilting of the body with respect to the spindle causes a corresponding tilt of the engaging structure and the complementary engaging structure relative to each other so that for both directions of rotation a play-free and a backlash-free transformation of the rotation of the spindle into a linear movement of the body and thus the positioned member is achieved. The torque exerted on the body is generated by the elastic property of at least a section of the elastic coupling member.

Second, the elastic coupling member serves to transmit a movement of the body to the positioned member, which simplifies the design of the positioning device considerably.

The positioning device according to the second aspect of the invention allows an easy transmission of a rotary movement of the spindle driven by a motor, in a manner free from play and free from back lash to lead the body which is translated to be positioned. In particular this positioning device does not require much space and is thus in particular suitable for use in microscopes, cameras and surveying instruments.

The outside engaging structure of the spindle and the complementary engaging structure of the body serve to transform a rotation of spindle into a translation of the body while the body is secured from being rotated by the spindle by means of the securing element. Generally, any type of engaging a structure and complementary engaging a structure suitable for this transformation may be used.

Preferably, the complementary engaging structure is formed and arranged such that when the body is tilted by the torque relative to the spindle a section of the complementary engaging structure engages with the engaging structure in a first direction along the spindle and another section of the complementary engaging structure with the engaging structure in a second direction opposite to the first direction. Thus, a play between the engaging structure and the complementary engaging structure can be avoided for movements in both directions.

Preferably, the engaging structure of the spindle may comprise at least one groove winding about the spindle. The pitch of the groove winding about the spindle may be constant or vary. In particular, the engaging structure may comprise an outside thread formed on the spindle. Spindles of this type can be produced quit easily with sufficient accuracy and can be assembled easily.

In particular in these cases, the complementary engaging structure of the body may comprise at least one protrusion or one rib. The protrusion or rib is formed and/or arranged to engage with the groove or thread of the engaging structure of the spindle. Use of a protrusion or rib as a complementary engaging structure may reduce friction between the engaging structure and the complementary engaging structure when the spindle is rotated while the body is secured from rotation by the securing element.

In order to achieve an operation with particularly little backlash, the complementary engaging structure of the body comprises preferably at least two protrusions or two ribs being arranged in opposition with respect to a radial direction of the spindle. The protrusions or ribs are arranged such that when the body is tilted by the torque relative to the spindle one of the protrusions or ribs engages with the engaging structure e.g. the groove or the thread, in a first direction along the spindle and the second protrusion or rip with the engaging structure, e.g. the groove or the thread, in a second direction opposite to the first direction. Thus, for movement in both directions a play between the engaging structure and the complementary engaging structure can be avoided. Generally, the protrusions or ribs may be spaced apart relative to one another in a direction parallel to the longitudinal direction of the spindle in such a manner, that both can engage with the engaging structure.

In another embodiment the complementary engaging structure of a body comprises at least one thread. Preferably, the thread is provided by a threaded through hole in the body, so that the body is also guided accurately by the spindle along the direction of the spindle. The thread of the complementary engaging structure may engage with the engaging structure of the spindle, in particular, a thread of the engaging structure of the spindle if this spindle is provided with a thread. Tilting of the threads with respect to each other causes contacts between flanks of the threads in both directions along the spindle, so that a play between the body and the spindle in the longitudinal direction of the spindle or a backlash can be avoided.

In particular in the case, when the engaging structure of the spindle comprises an outside thread, the complementary engaging structure of a body may comprise at least two ribs or grooves running in parallel. The ribs or grooves may in particular be linear. In this case, the body may be clipped onto the spindle as the ribs or grooves do not need to be provided in a through hole. This allows very simple assembly of the positioning device.

Alternatively, the engaging structure of the spindle may comprise at least one protrusion or at least on rib on an outer surfaces of the spindle. The complementary engaging structure in this case may be for example a thread in a threaded through hole of the body.

Preferably, the engaging structure of the spindle may comprise at least two protrusions arranged in opposition with respect to radial direction of the spindle. The protrusions may in particular be space apart with respect to each other in the direction of the spindle. The complementary engaging structure may comprise in particular a thread or ribs or grooves running in parallel. Also in this case, the protrusions may engage the complementary engaging structure at faces of the complementary engaging structure pointing in opposite directions along the spindle, so that a play-free and/or backlash-free transformation of the rotation of the spindle into a movement of the body can be achieved.

Generally, the engaging structure and/or the complementary engaging structure may comprise one of the above-mentioned features or a combination thereof.

The elastic coupling member may exert the torque to tilt the body in different ways. In one embodiment, the elastic coupling member rests with at least one section thereof on the positioned member to exert the tilting torque on the body. In this way, a particularly simple construction of the positioning device can be achieved. In particular, at the same time, force can be exerted on the positioned member. This force may serve to bias the positioned member towards a guiding element guiding the positioned member so that further play or backlash can be avoided.

Generally, the elastic coupling member exerts a torque to tilt the body with respect to the spindle about an axis inclined to or preferably orthogonal to the longitudinal direction of the spindle. Preferably, the elastic coupling member is attached to the body and the positioned member and exerts the torque about an axis being parallel to the spindle. This additional torque may be used to urge the positioned member in a corresponding direction. Thus, the elastic coupling member may at the same time exert torques about different axes, i.e. a torque having components in a direction orthogonal to the longitudinal direction of the spindle and parallel to the longitudinal direction of the spindle.

The elastic coupling member may transmit the movement of the body to the positioned member in any a suitable manner. Preferably, the positioned member comprises a groove, which the elastic coupling member engages with, the groove having preferably outwardly diverging sidewalls. In particular, the groove may be V-shaped. The use of the groove to transmit the movement of the body and of the elastic coupling member attached thereto to the positioned member allows a particularly easy assembly of the positioning device. Further, in the case, that the groove has outwardly diverging sidewalls, also a backlash-free and play-free transmission of movements in opposite directions can be achieved.

In order to exert the torque and at the same time to transmit the body the positioned member, it is preferred that the elastic coupling member comprises an L-shaped arm, the free end of which engages with said groove. The geometry of the L-shaped arm can be chosen in combination with the material properties of the material used to form the L-shaped arm to set the torque tilting the body relative to the spindle.

The elastic coupling member may be made from a suitably bent spring steel, which is clipped onto the body. This embodiment provides the advantage that the spring steel may be chosen to keep its elastic properties for a long time and even under varying environmental conditions, such as widely varying temperatures.

A particularly simple construction is obtained, when the elastic coupling member is integrally formed with the body. In particular, at least a part of the body and the elastic coupling member may be formed by pressing or injection molding of a suitable polymeric material.

The complementary engaging structure in the body in the form of a thread may be provided in different ways. The body may comprise an opening with the thread of the body being provided in the opening. In particular, the thread can be cut into the surfaces of the opening, which is quite simple in the case that the body is made from polymer.

Alternatively, the body may comprise a block and a sleeve arranged in the block and having an inner thread for receiving the spindle. In particular, the sleeve can be made from a material which is resistive against abrasion by the engaging structure of the spindle and/or causes only low friction when engaging with the engaging structure of the spindle. In particular, a sleeve made from a suitable metal can be used. In this way, a very robust design can be achieved.

In order to reduce the friction between the engaging structure of the spindle and the complementary engaging structure of the body the thread in the body may comprise two sections of thread separated by a section having no thread. At the same time, a stable mounting of the body on the spindle is obtained.

Preferably, a guide is provided for guiding the positioned member along the direction parallel to the spindle, in particular with the guide guiding the body. In this case, the elastic coupling does not need to guide the positioned member so that a simple construction with a very accurate guiding of the positioned member and thus a very accurate movement of the position member can be obtained. The guide may be in particular the first guide mentioned above.

Generally, a separate element may be used as a securing element. Preferably, however the guide secures the body against rotation about the spindle. Thus, the guide also represents the securing element for securing the body from being rotated by the spindle. Thus, the guide provides two different functions, which simplifies the construction of the positioning device.

In order to ensure an accurate guiding of the positioned member, preferably the guide comprises a rod and the position member comprises an opening receiving the rod. In this way a guiding of the positioned member is achieved which leaves only one degree of freedom of translational movement of the positioned member, that is a linear movement.

To ensure, that the body is secured from rotation with the spindle in both rotation directions, the body preferably comprises a recess for receiving the guide.

According to the third aspect of the invention, a positioning device is provided, the positioning device comprising a positioned member; a first guide for guiding the first section of the position member along a first guiding axis; a second guide having a guiding surface extending parallel to the first guide axis and for guiding a second section of the positioned member; and a magnet device biasing the second section of the positioned member towards the guiding surface of the second guide.

The first guide may restrict translations of the positioned member to translations along the first guiding axis, but generally not other movements of the positioned member. The combination of the second guide and the magnetic device biasing the second section of the position member towards the guiding surface of the second guide ensures a further restriction of the degrees of freedom of movement of the positioned member with little or no backlash or play, so that the positioned member is accurately guided along the guiding surface of the second guide. In particular, if the biasing force of the magnetic device is strong enough, an accurate guiding of the positioned member along the guiding surface can be obtained in several orientations, preferably any orientation, of the positioning device with respect to gravity. This may be of particular importance for surveying instruments having a telescope unit with a positioning device, the telescope unit being rotatable about a horizontal axis by arbitrary angles.

The positioning device according to the third aspect of the invention may comprise any of the features of the positioning device according to the first aspect of the invention and/or the positioning device according to the second aspect of the invention. Conversely, the positioning device according to the first aspect of the invention may further comprise a positioned member; a first guide for guiding a first section of the position member along the first guiding axis; a second guide having a guiding surface extending parallel to the first guide axis and for guiding a second section of the positioned member; and a magnet device biasing the second section of the positioned member towards the guiding surface of the second guide.

The positioning device according to the first aspect of the invention may further comprise a positioned member; a body being movable along the spindle and having a complementary engaging structure engaging with the engaging structure of the spindle to transform a rotation of the spindle into a translation of the body when the body is secured from being rotated by a spindle; a securing element securing the body from being rotated by the spindle; an elastic coupling member exerting a torque to tilt the body relative to the spindle and transmitting a movement of the body to the positioned member; a first guide for guiding a first section of the positioned member along the first guide axis; a second guide having a guiding surface extending parallel to the first guide axis and for guiding a second section of the positioned member; and a magnet device biasing the second section of the positioned member towards the guiding surface of the second guide. The positioning device according to the second aspect of the invention may further comprise a first guide for guiding a first section of the positioned member along a first guiding axis; a second guide having a guiding surface axis in parallel to the first guide axis in for guiding a second section of the positioned member; and a magnet device biasing the second section of the positioned member towards the guiding surface of the second guide.

Generally it is sufficient, that the magnet device which comprises at least one magnet biases the second section of the positioned member towards the guiding surface of the second guide. In order to be able to avoid play or backlash of the positioned member with respect to the first guide the magnet device preferably generates a biasing force being inclined with respect to a normal onto the guiding surface.

Preferably, the first guide restricts the motion of the positioned member to a motion along the first guiding axis and a pivoting motion about the first guiding axis. In particular, the first guide may then comprise a guiding rod. Hereby, a smooth, but accurate guiding can be obtained.

Further, the positioned member may comprise a guiding opening receiving the guiding rod. In this way, the first guide restricts the motion of the positioned member to the translation along the first guiding axis and just one further degree of freedom, i.e. the pivoting motion about the first guiding axis, so that in combination with the second guide and the magnet device a precise guiding of the positioned member is achieved.

In order to reduce the friction between the second section of the positioned member and the guiding surface it is preferred that the positioning device further comprises a rolling bearing mounted to the second section of the positioned member and comprising an outer member which rolls on the guiding surface.

The magnet device comprises a magnet for generating the biasing force with a suitable corresponding armature element. In one embodiment, the magnet device comprises a magnet fastened to the positioned member. This allows using a small magnet which reduces weight and also the extension of magnetic fields generated by the magnet which might interfere with other parts of the positioning device.

In particular in this case, it is preferred, that a soft-magnetic or ferromagnetic armature element is mounted to the second guide with the magnetic device interacting with the armature element and pulling the second section towards the guiding surface. This embodiment allows using different materials for the armature element and the second guide, so that these can be optimized to their respective functions.

Alternatively, the second guide may be made of a soft-magnetic or ferromagnetic material, with the magnetic device interacting with the second guide as an armature element and pulling the second section towards the guiding surface. This embodiment has the advantage, that a smaller number of parts constituting to the positioning device is needed.

As an alternative to a magnet fastened to the positioning member, alternatively or supplementary, the magnetic device may comprise a longitudinally extending magnet being mounted fixed relative to the second guide and the positioned member may comprise a soft-magnetic or ferromagnetic section. The ferromagnetic section may be arranged with respect to the magnetic device such, that a force generated between the magnetic device and the soft-magnetic or ferromagnetic section, i.e. the positioned member, pulls the second section towards the guiding surface. This embodiment may be preferable, if mounting of a magnet to the positioned member is difficult or impossible.

In order to pull the second section of the positioned member towards the guiding surface and at the same time to bias the positioned member in the direction orthogonal or inclined to the first guiding axis the magnet device preferably generates a force being inclined relative to a straight line connecting the first and second sections of the positioned member.

The positioning devices according to the invention may be used for any purposes, preferably however for optical devices having a lens to be positioned. In this case, it is preferred for a positioning device according to the second and/or third aspect of the invention and corresponding preferred and special embodiments thereof that the positioned member is a lens holder. In this case, a very simple construction of a corresponding optical device may be obtained.

According to a further aspect of the invention, an optical instrument is provided, comprising a positioning device according to any of the proceeding claims. The optical instrument may be in particular a surveying instrument, for example, a leveling instrument, a theodolite or preferably a tachymeter.

In this case, the optical instrument preferably comprises at least one lens coupled to the positioning device. This allows a very accurate and/or low noise and/or backlash-free and/or play-free positioning of the lens.

Preferably, the optical instrument may comprise an objective and a focusing lens, the focusing lens being arranged with respect to the objective to form an optical system for imaging an object and being coupled to the positioning device, so that an object imaged by the optical system can be focused. Thus, a corresponding optical instrument allows focusing by means of a motor, in particular an electric motor. Further, auto-focusing is easy possible if suitable auto-focusing sensors and electronics are used.

The optical instrument may be a telescope, in particular a telescope for use in a surveying instrument.

Alternatively, the optical instrument may be a camera, in particular a camera for use in a surveying instrument as for example video-tachymeter.

The optical instrument may in particular further comprise an alidade, rotatable about a vertical axis, the telescope or the camera, respectively being mounted to the alidade tiltable about a tilting axis substantially orthogonal to the vertical axis. Such an optical instrument may be in particular a surveying instrument such as a levelling instrument, a theodolite or a tachymeter.

The invention is explained in more detail below, by way of exemplary embodiments and with reference to the drawings, wherein:

FIG. 4 shows a schematic view, in partial section, of a positioning device for positioning a focusing lens for the tachymeter of FIG. 1;

FIG. 5 shows a perspective view of a lens holder of the positioning device of FIG. 4;

FIG. 6 shows a schematic perspective view of a curved tube of the positioning device of FIG. 4;

Figure 8:
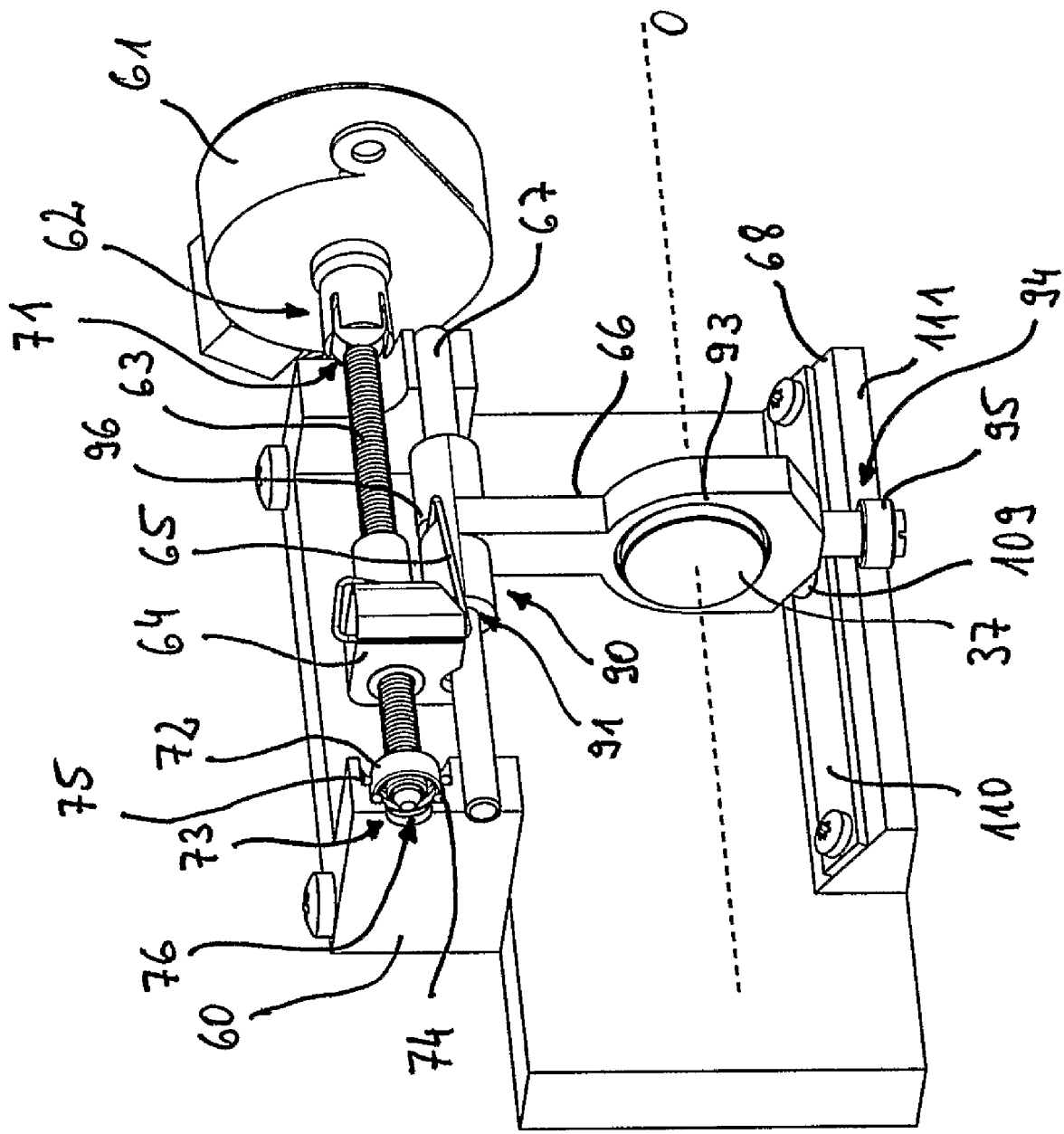
FIG. 8 shows a perspective view of a positioning device for moving the focusing lens of the tachymeter of FIG. 7 according to a preferred exemplary embodiment of the invention.
Figure 10:
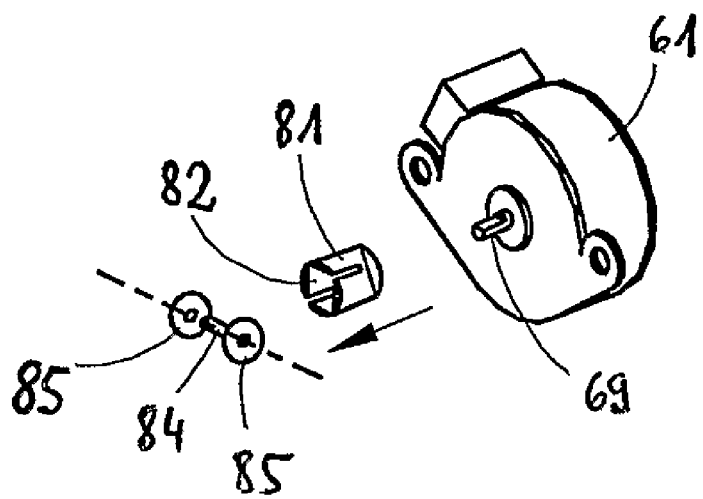
Figure 11:
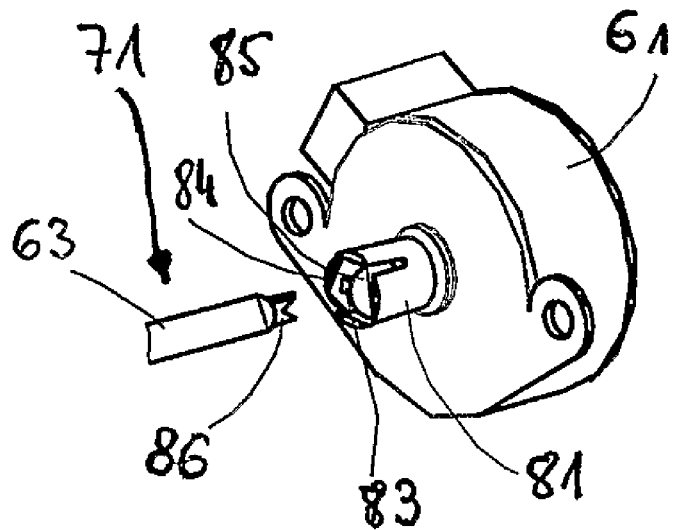
Figure 12:
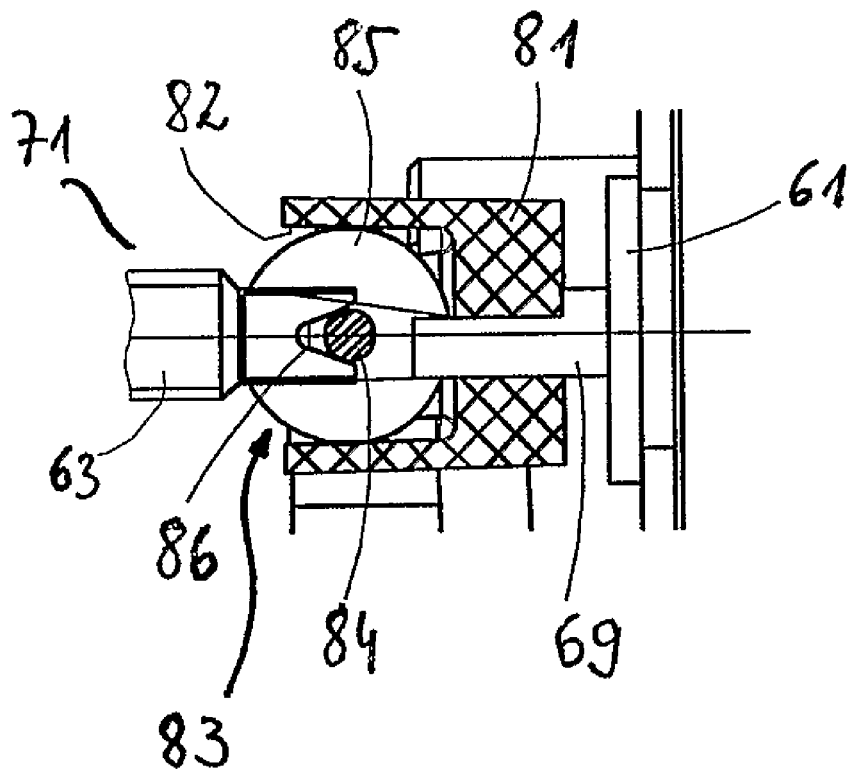
Figure 13:
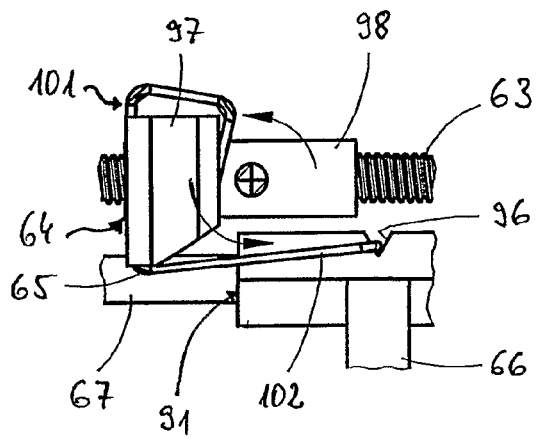
Figure 14:
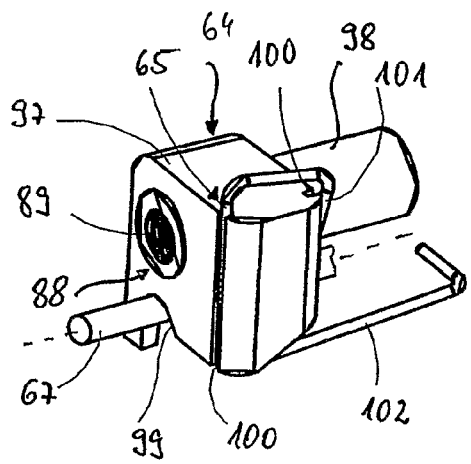
Figure 15:
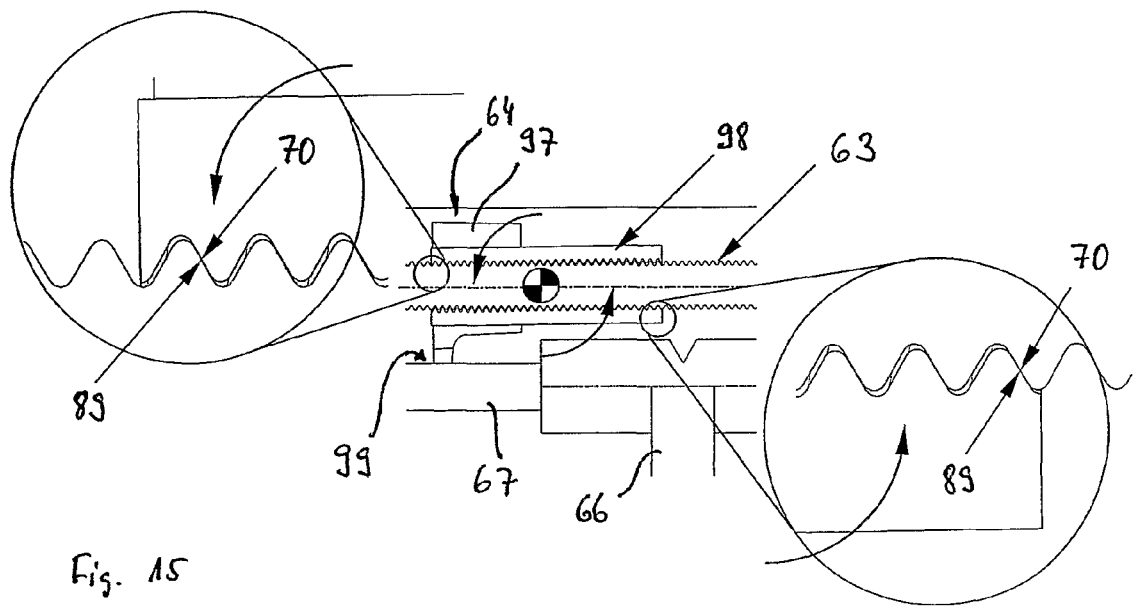
Figure 16:
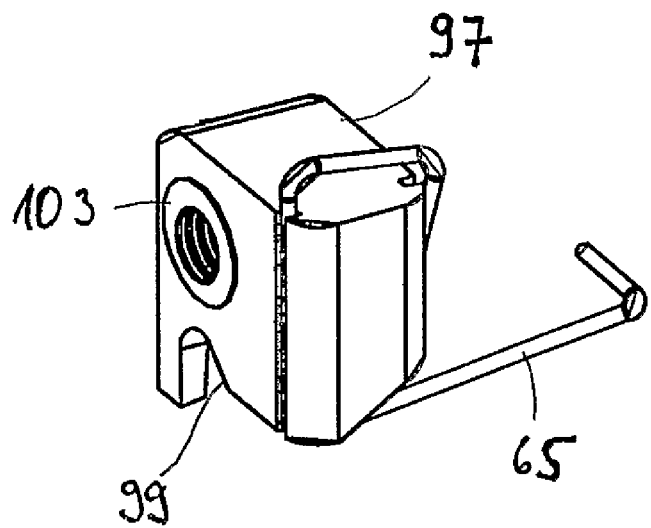
Figure 17:
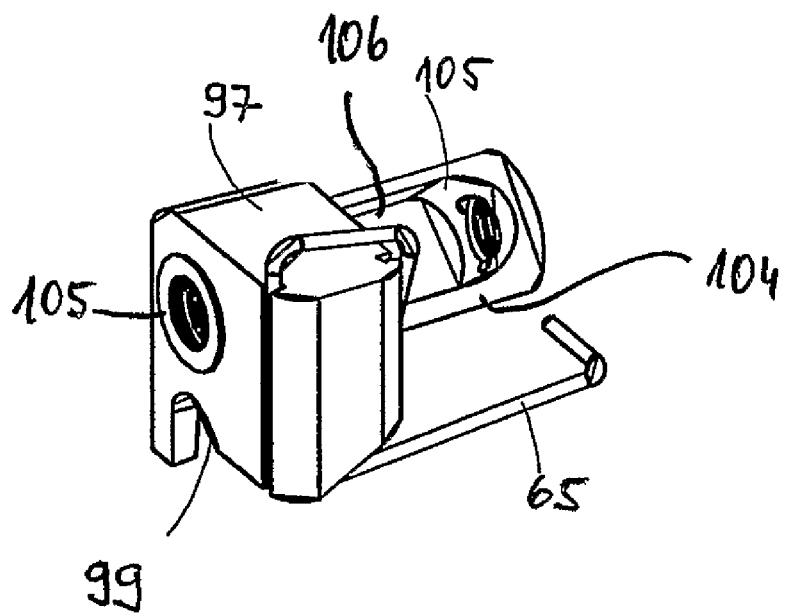
Figure 18:
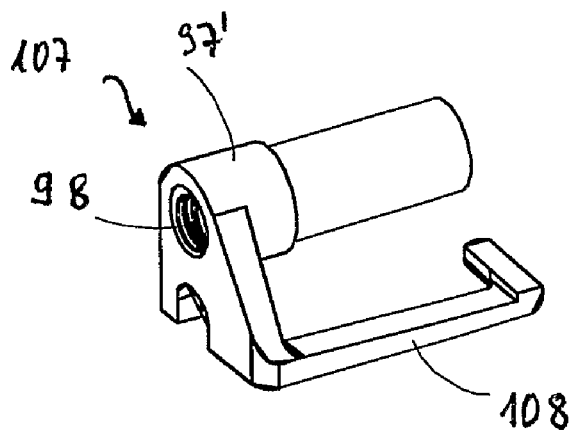
Figure 19:
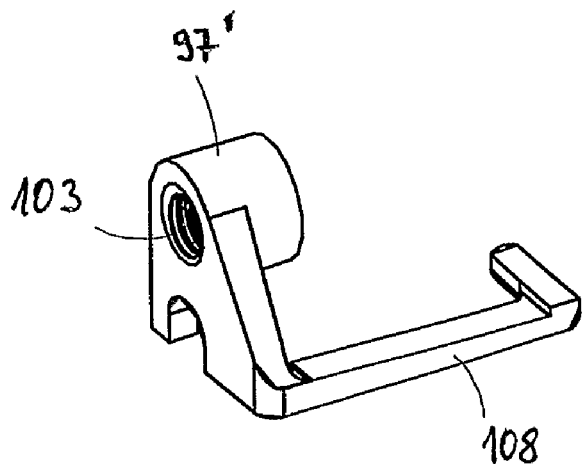
Figure 20:
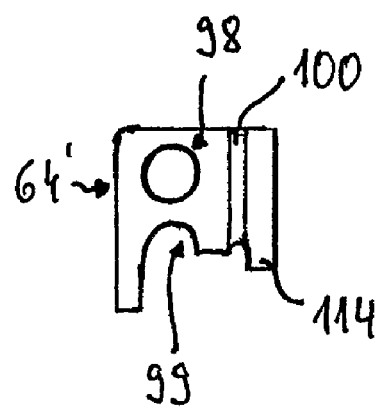
Figure 21:
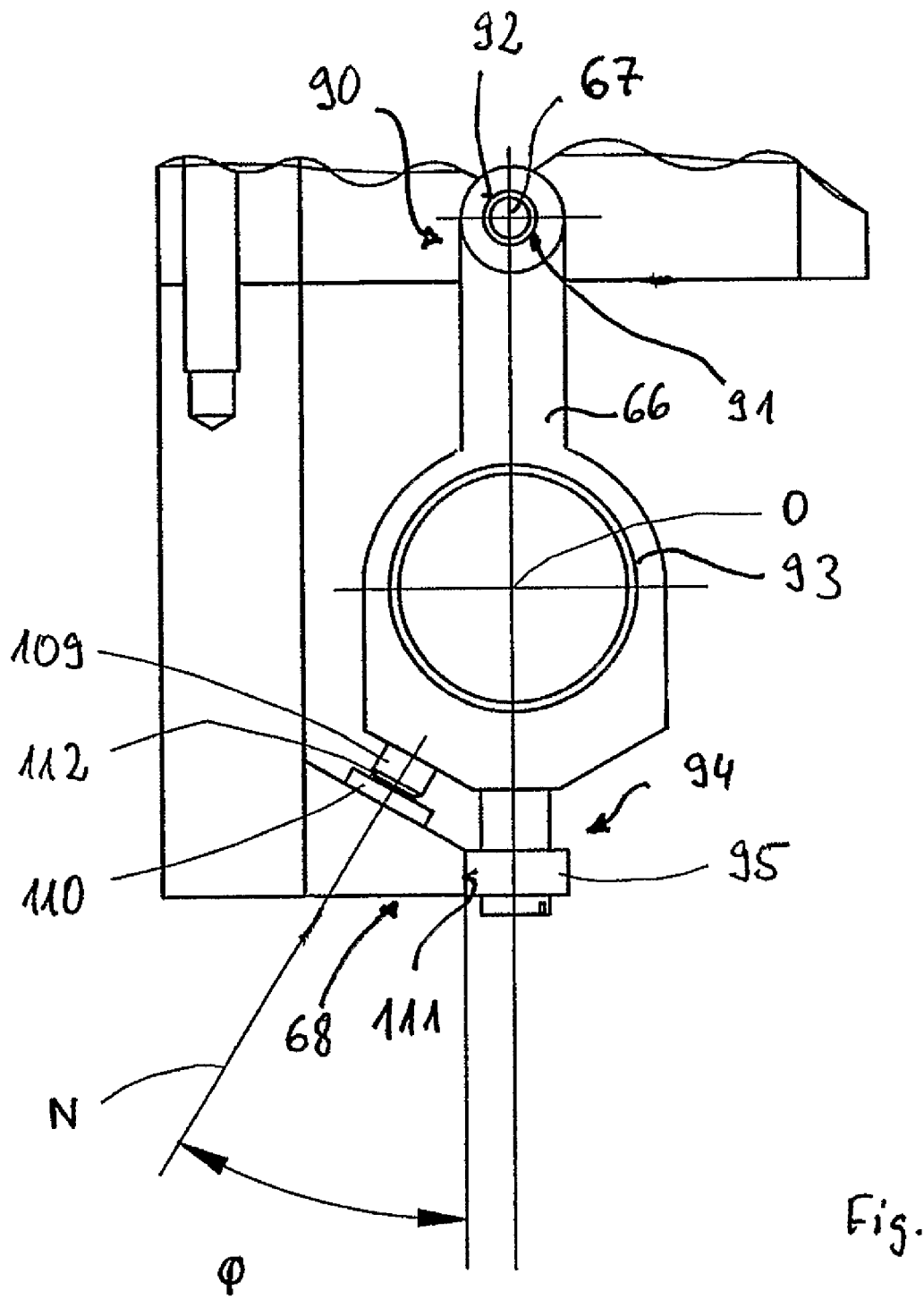
Figure 22:
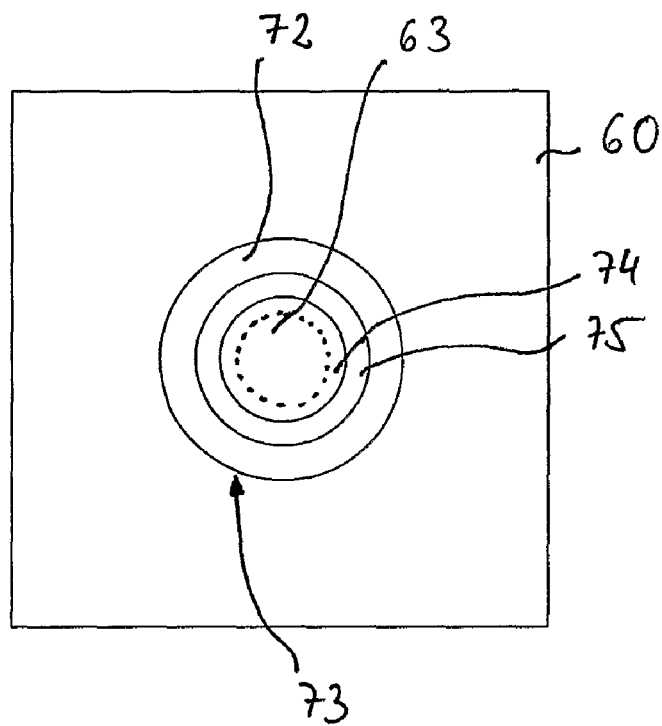
Figure 23:
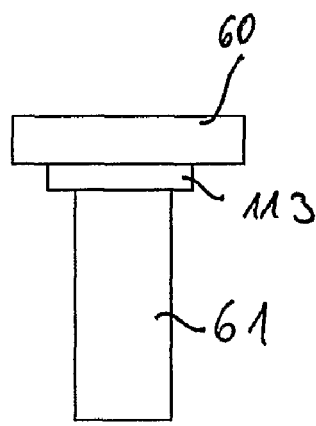
Figure 24:
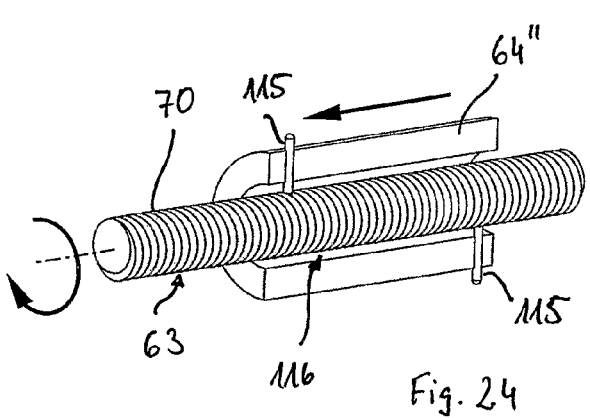
Figure 25:
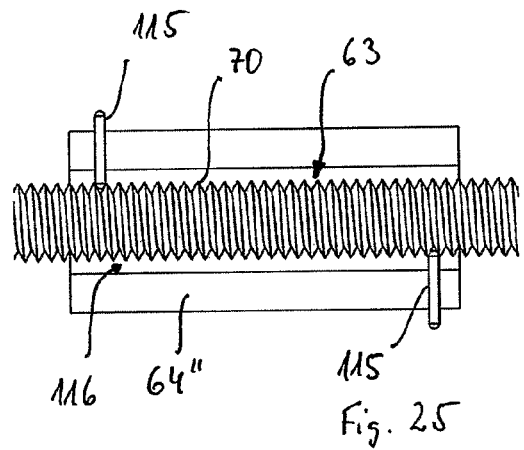
Figure 26:
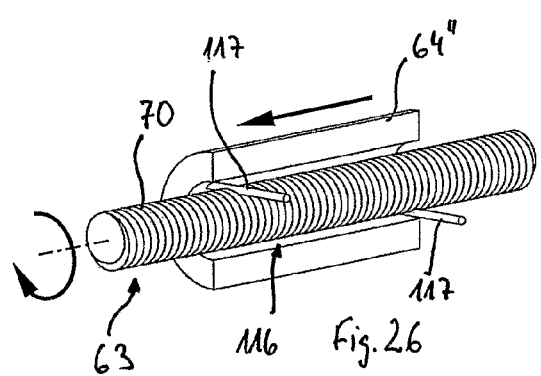
Figure 27:
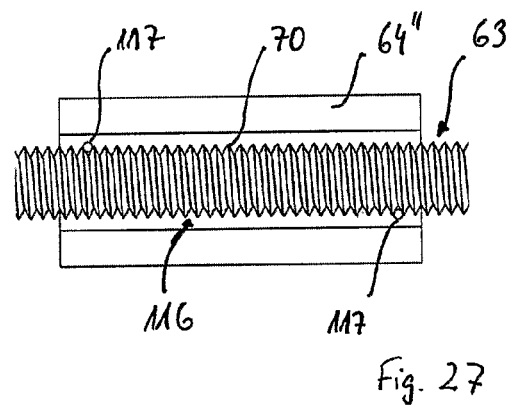
Figure 28:
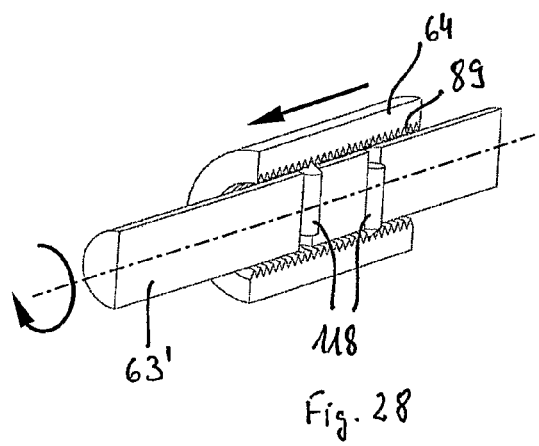
Figure 29:
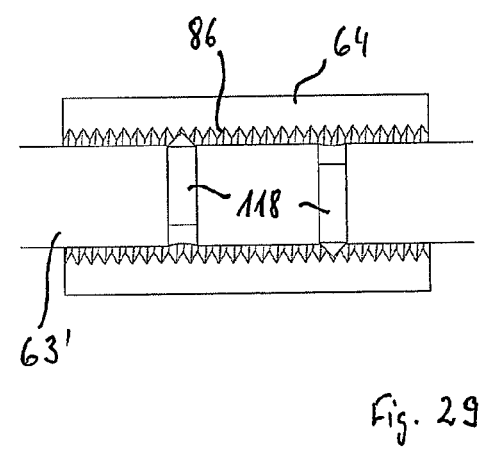

FIG. 10 an exploded, perspective view of a resilient coupling for a first end of the threaded spindle and of a motor of the device shown in FIG. 8;

FIG. 11 shows a perspective view of the motor with the resilient coupling of FIG. 10 held thereon and of a first end of the threaded spindle;

FIG. 12 shows a sectional view of the motor, of the coupling held thereon, and of the threaded spindle, in an operative condition;

FIG. 13 an enlarged lateral view of a body driven by the threaded spindle and being guided by a first guide and of an elastic coupling member in the positioning device of FIG. 8;

FIG. 14 a perspective view of the body guided by the first guide and the elastic coupling member held on the body in the assembly shown in FIG. 13;

FIG. 15 shows an enlarged sectional view of the arrangement of FIG. 13, with two enlarged details to illustrate the relative position of the flanks of the thread of the threaded spindle and of an internal thread of the body driven by said spindle;

FIG. 16 shows a perspective view of a body having a shortened threaded sleeve;

FIG. 17 shows a perspective view of a body comprising a threaded sleeve with two spaced apart threaded portions and the elastic coupling member;

FIG. 18 shows a perspective view of a body with an integrated elastic coupling member;

FIG. 19 shows a perspective view of a body with an integrated elastic coupling member and a shortened threaded sleeve;

FIG. 20 shows a front view of a body with an integrated elastic coupling member according to another embodiment;

FIG. 21 shows a partial view of first and second guides and of a lens holder of the device of FIG. 8, said lens holder being guided by them;

FIG. 22 shows a schematic view of a cross-section of a threaded spindle and of an support assembly for elastically supporting the threaded spindle in a positioning device according to a further preferred embodiment of the invention;

FIG. 23 shows a schematic representation of an elastically supported motor of a positioning device according to a still further preferred embodiment of the invention;

FIG. 24 shows a schematic part-sectional perspective view of a threaded spindle and a body driven by the spindle and having pins as a complementary engaging structure, the spindle and the body being part of a positioning device according to yet another exemplary embodiment of the invention;

FIG. 25 shows a schematic part-sectional side view of the arrangement in FIG. 24;

FIG. 26 shows a schematic part-sectional perspective view of a threaded spindle and a body driven by the spindle and having pins as a complementary engaging structure, the spindle and the body being part of a positioning device according to yet another exemplary embodiment of the invention;

FIG. 27 shows a schematic part-sectional side view of the arrangement in FIG. 26;

FIG. 28 shows a schematic part-sectional perspective view of a spindle having two pins as a engaging structure and a body driven by the spindle and having an internal thread as a complementary engaging structure, the spindle and the body being part of a positioning device according to yet another exemplary embodiment of the invention; and FIG. 29 shows a schematic part-sectional side view of the arrangement in FIG. 28.

Figure 1:
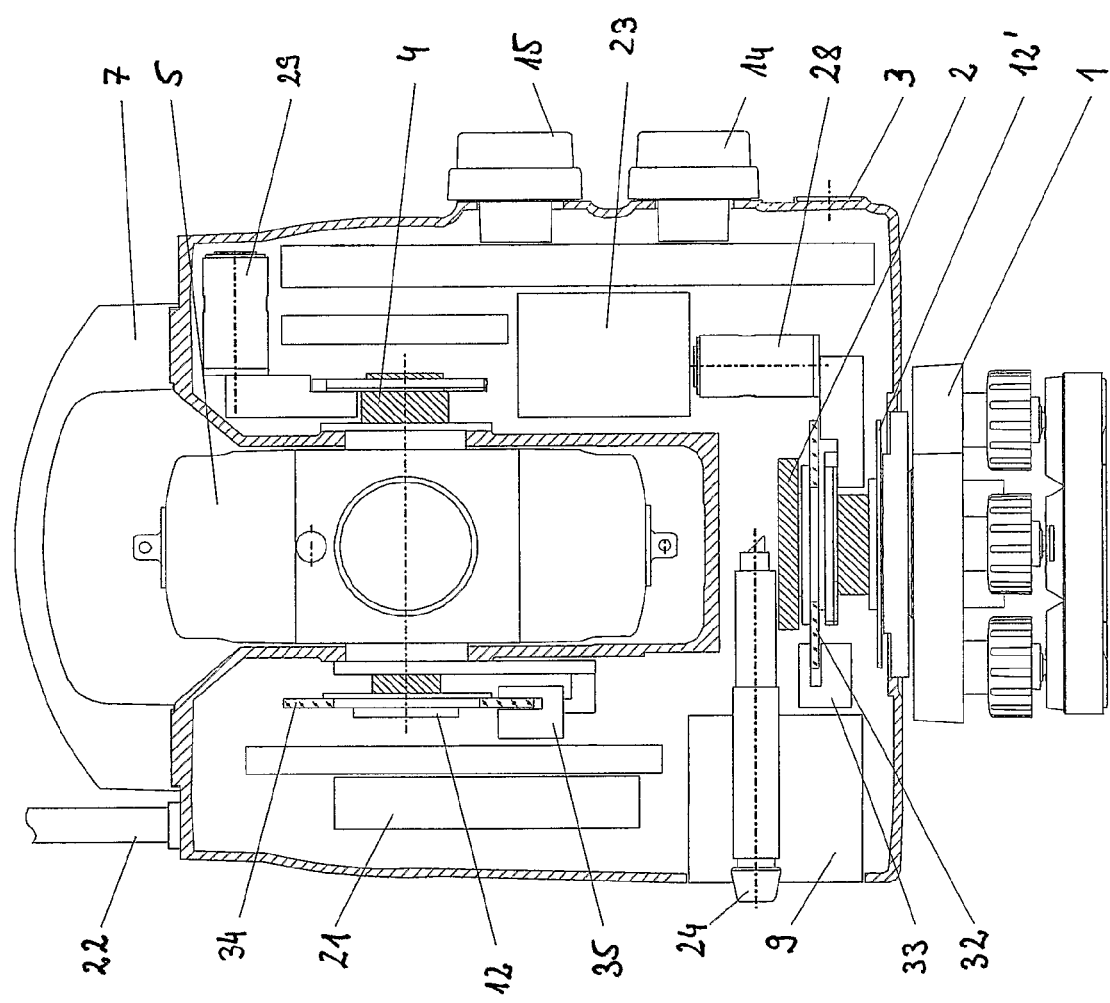
FIG. 1 shows a schematic, part-sectional front view of a tachymeter.
Figure 2:
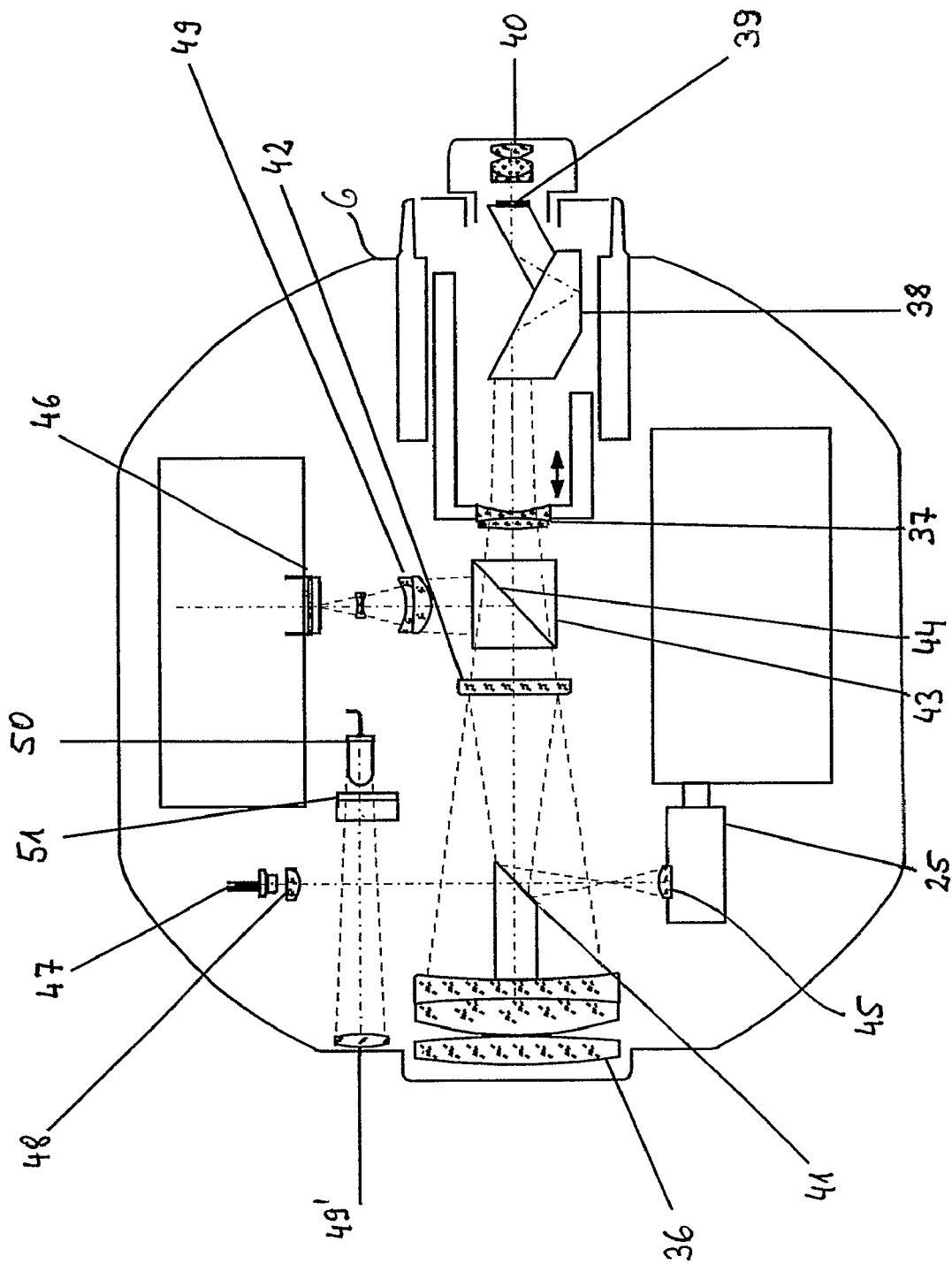
FIG. 2 shows a schematic, lateral section of a telescope unit of the tachymeter of FIG. 1.
Figure 3:
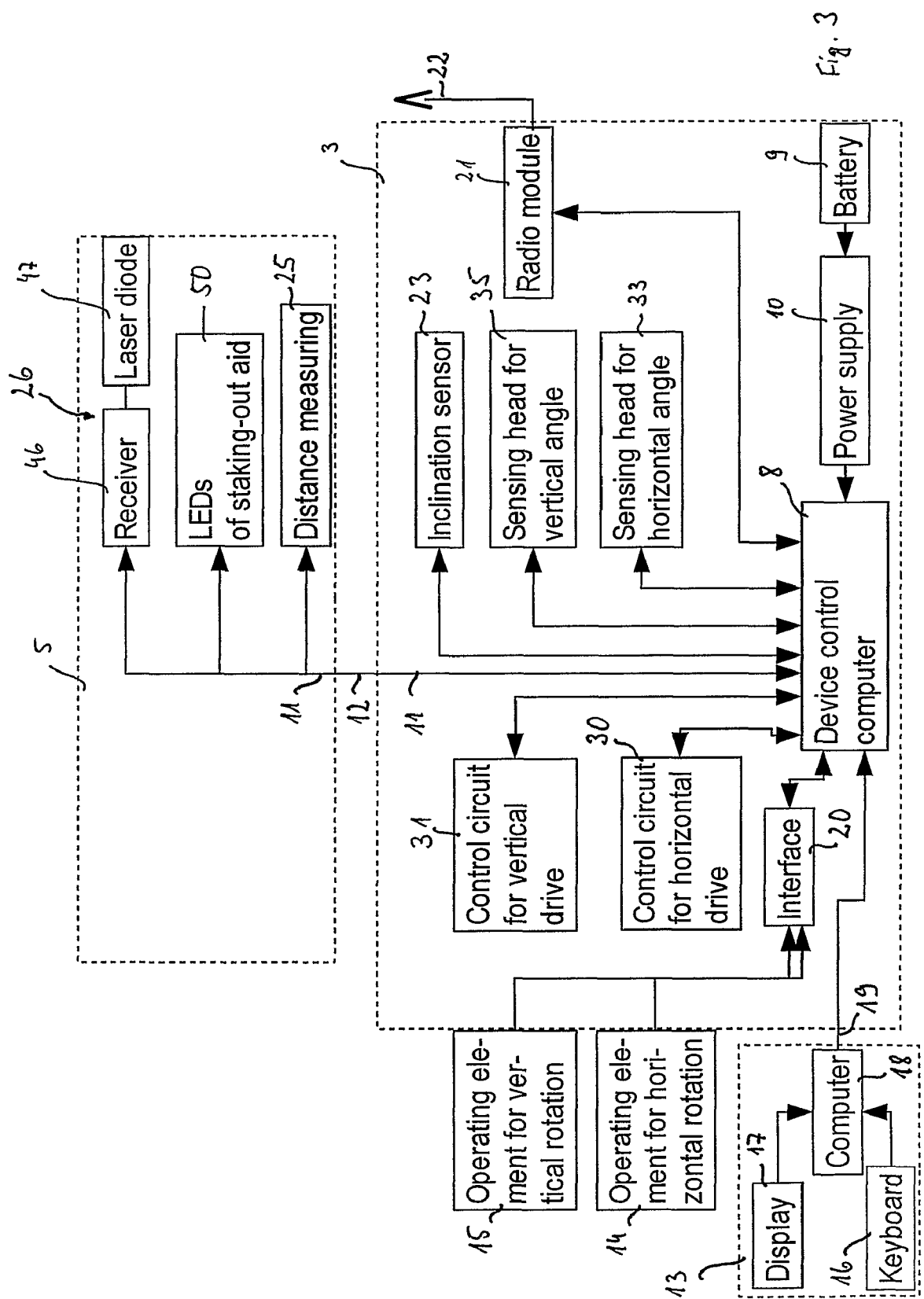
FIG. 3 shows a simplified block diagram of the tachymeter of FIG. 1.

A tachymeter shown in FIGS. 1 to 3, which is also referred to as a total station, may be used for surveying purposes in geodesy. In such surveying operations, the angular positions of targets in a horizontal plane and in a vertical plane and the distance from said targets to the tachymeter are determined, which can then be used to determine positional data or coordinates, respectively, of the target. As targets, objects or sections of objects, which are present in the field anyway, may be used, in principle, but in many cases use is made also of artificial targets, e.g. reflectors, which are placed at predetermined positions, which are to be surveyed, by surveyors. Said artificial targets may be used to mark predetermined points on the earth's surface, such as boundary stones, for example, and to determine their position by means of the tachymeter. However, the position of targets can not only be surveyed, but it is also possible to find and then mark, in the field, points having certain known coordinates or positions. To this end, using the tachymeter, the targets can be placed in the position given by the coordinates, in which fixed marks are then installed.

For easy and quick determination of the angular positions and of the distance from the targets to the tachymeter, and in order to detect targets, the tachymeter comprises six optical devices in the example. They are: a telescope for sighting of targets; two angle-measuring devices for determining the horizontal and vertical angles of the target sighted with the telescope; a distance-measuring device for determining the distance of a target sighted with the telescope from the tachymeter; a tracking device, also referred to as a tracker, for tracking a predetermined target, such as a reflector, when said target is moved from one location to another by a person, e.g. during surveying; and a stacking-out aid, also referred to as "track light", which facilitates exact alignment, with the tachymeter, of an artificial target set up by a surveyor. Two further devices, an inclination sensor or clinometer for determining the inclination of the tachymeter relative to a horizontal plane, and an optical plummet, serve to orient and/or position the tachymeter relative to the ground or to a given point on the ground.

FIGS. 1 to 3 show the structure of the tachymeter in a schematic and simplified representation.

An alidade 3 is arranged on a tripod 1 being supported by a stand not shown in the figures. The alidade 3 is rotatable about a vertical spindle or vertical axis 2, which extends vertical to the ground if the tachymeter is correctly set up. The alidade 3 carries a telescope unit 5, which comprises a housing 6 and a permanently built-in telescope, said telescope unit 5 being rotatable about a tilting axis 4, which is orthogonal to the vertical axis 2. The alidade 3 is rotatable about the vertical axis or spindle 2 and the telescope unit 5 is rotatable about the tilting axis 4 at any desired angle, i.e. even at angles exceeding 360°. The tachymeter can be carried by means of a handle 7 provided on the alidade 3.

Any movement of components of the tachymeter, except when focusing the telescope, the detection of measured values and the actuation of some of the aforementioned optical devices, such as the stacking-out aid, is effected electronically. FIG. 3 shows a block diagram, in which the various functional blocks of the tachymeter are schematically shown, including their connections to each other. The broken lines indicate the physical units in which the respective components and devices are arranged.

The central element of the control unit is a device-control computer 8, which is arranged in the alidade 3 and connected to the individual components and devices.

A battery 9, which is arranged in the alidade 3 and feeds a power supply unit 10, serves to supply the tachymeter and, in particular, the device-control computer 8 with power via the power supply unit 10. The power supply unit 10 supplies all components and devices in the alidade 3 and the telescope unit 5, as well as any modules connected to it, with the required operating voltages. For the sake of a better overview, these connecting lines are not shown. As shown in the alidade 3, the individual components can be connected individually via separate lines to the device-control computer 8 and to the power supply unit 10. However, it is also possible, as shown for the telescope unit 5, to connect the components to a central bus 11, which contains all the data and power supply lines.

Slip rings 12, which are connected with the bus 11 and via which electric or electronic components in the telescope unit 5 can be supplied with power and can exchange data with components in the alidade 3, are arranged on the tilting axis 4.

Slip rings 12' on the vertical axis 2 enable a power supply from outside as well as a data transfer to or from external devices via a plug, which is not shown.

For control or operation of the tachymeter, the tachymeter is provided with a removable control panel 13 and operating elements 14 and 15 in the form of angle encoders with operating knobs arranged on the alidade 3.

The control panel 13 serves for communication between the operator and the tachymeter and is provided with a keyboard 16 for input, a display 17 for output of data, e.g. an LCD, and a computer 18, which is connected to the display 17 and the keyboard 16. The control panel 13 is connected to the device-control computer 8 and the power supply unit 10 via a releasable connection 19. Since the control panel 13 is removable, it may be equipped with its own battery, which ensures that the computer 18 continues to work, when the control panel 13 is removed. The computer 18 is connected to the device-control computer 8 via the connection 19 and can run numerous geodesic applications, which are known per se, by means of its program and data memories.

The operating elements 14 and 15 are connected to the device-control computer 8 via a corresponding interface 20. The interface 20 enables input of parameter values corresponding to a rotary position of the operating elements 14 and 15, respectively.

A radio module 21, which is connected to the device-control computer 8 and has an antenna 22, serves to exchange data with remote devices, such as a remote control. For example, the tachymeter can be remote-controlled by a remote control or station, which is located at the target point of the measurement, but is not shown in the Figures.

The various components and devices, respectively, of the tachymeter are arranged, with a few exceptions described below, in the alidade 3 and in the telescope unit 5.

In addition to the control-device computer 8, all components connected to the device-control computer 8 are located in and on the alidade 3. These include the inclination sensor or clinometer 23, the optical plummet 24, the radio module 21 with antenna 22, and the operating elements 14 and 15 for horizontal and vertical adjustment, including the interface 20.

The devices located in the telescope unit 5 are the distance-measuring device 25, the tracking device 26 and the staking-out aid 27. Optionally required control or evaluation means are provided by the device-control computer 8 arranged in the alidade 3. To this end, said devices are connected to the device-control computer 8 via the bus 11 and the slip rings 12. Each of said devices can be individually turned on and, if required, be polled or checked for measurement readings via the device-control computer 8. This purpose is served by components which are not shown in detail, because their operation is known to those skilled in the art.

Drives 28 and 29, respectively, which are controlled via control circuits 30 and 31 in the alidade 3, are provided for rotating the alidade 3 including the telescope unit 5 about the vertical axis 2 and for rotating the telescope unit 5 about the tilting axis 4. Angle measurements by means of the angle-measuring devices may be used to control the drives 28 and 29.

For measurement of an angle of rotation or of a horizontal angle about the vertical axis 2, use is made of a graduated circle 32 for the horizontal angle, said circle 32 being concentric with the vertical axis 2, and of a sensing head 33, which is held on the alidade 3 and by means of which an angular position of the alidade 3, and thus of the telescope unit 5, relative to the graduated circle 32 can be sensed.

For measurement of an angle of rotation about the tilting axis 4, i.e. of a vertical angle, a graduated circle 34 for the vertical angle is correspondingly held on and coaxial with the tilting axis 4, the angular position of said graduated circle 34 being sensed by a sensing head 35 for the vertical angle, which sensing head 35 is held on the alidade 3.

The drives 28 and 29 cooperate with the angle-measuring devices, i.e. the graduated circle 32 for the horizontal angle and the sensing head 33, or the graduated circle 34 for the vertical angle and the sensing head 35, respectively, in a known manner such that the alidade 3 with the telescope unit 5 can be rotated as desired in a measurable manner about the vertical axis 2 and the telescope unit 5 can be rotated about the tilting axis 4 in a measurable manner and can be brought into a desired horizontal and vertical angle position. This purpose is served, inter alia, by the device-control computer 8, which receives signals from the sensing heads 33 and 35 and controls the control circuit 30 for the horizontal drive 29 and the control circuit 31 for the vertical drive 28 as a function of said signals. The angles by which the alidade 3 is to be rotated about the vertical axis 2 and by which the telescope unit 5 is to be rotated about the tilting axis 4 can be provided in three ways. First, the operating elements 14 and 15 are provided on the alidade 3 for rotations in the horizontal and vertical planes, respectively, in the form of angle encoders, which are connected to the device-control computer 8 via the interface 20 and allow input of corresponding angles to the device-control computer 8. Alternatively, the device-control computer 8 can determine the angle to be set also as a function of data from other components of the tachymeter and can accordingly control the control units 30 and 31, respectively. A third possibility consists in inputting the angle via the control panel 13 or from a remote station via radio by means of the radio module 21.

In the following, the individual devices mentioned above are described in more detail.

The optical plummet 24 arranged in the alidade 3 serves to center or position the tachymeter above a point on the ground. It comprises a small telescope pointing downwardly in a vertical direction. An optical axis of the small telescope is substantially coaxially with the vertical axis 2. Thus, the optical plummet 24 can be used to center or position the tachymeter above a point on the ground, such as a boundary stone, for example. As an alternative an optical plummet could be used which emits a beam downwardly in a vertical direction, said beam extending substantially coaxially to the vertical axis 2.

The inclination sensor or clinometer 23, which is also arranged in the alidade 3, measures the inclination of the alidade 3 and, thus, of the tachymeter in two directions which are orthogonal to each other and, thus, allows to check whether the vertical axis 2 is in a vertical position and whether the tilting axis 4 is in a horizontal position relative to the ground.

The other devices are arranged in the telescope unit 5, which is shown from the front in FIG. 1 and in a lateral, sectional view in FIG. 2.

First of all, housing 6 of the telescope unit 5 accommodates a telescope which serves to visually sight a target. The telescope comprises an objective 36, a focusing lens system 37, which is arranged following the objective 36 in the optical path and is only referred to as a focusing lens in the following, but may comprise more than one lens, an inverting prism 38, and a cross-lines grid or cross-hairs 39, on which the objective 36, the focusing lens 37 and the inverting prism 38 generate an image which can be viewed through an eye-piece 40. The image being generated on the cross-lines grid 39 can be focused by displacing the focusing lens 37 along the optical axis, as indicated by a double arrow in FIG. 2. The optical axis of the telescope extends coaxially with the optical axis of the objective 36.

In the optical path of the telescope, there are further arranged a prism 41, a dichroic mirror 42 and a splitting prism 43 comprising a splitting layer 44, which are transparent to radiation in the visible range, however, and therefore do not influence the telescope function, i.e. the forming of an image.

The distance-measuring device 25 measures the distance between a target and the tachymeter by directing modulated radiation to the target and receiving the radiation reflected back by the target. The distance-measuring device 25 can then determine the distance to the target by determining a phase difference between the emitted modulated optical radiation and the received optical radiation and determining said distance from the phase difference using the speed of the radiation of use. In another embodiment of the distance-measuring device, the optical radiation is emitted in a pulsed manner, and the time-of-flight of a pulse on its way from the distance-measuring device to the target and back to the distance-measuring device is determined and, on the basis of said time-of-flight, the distance is determined, using the speed of the radiation of use. The distance can be determined from the phase difference or from the time-of-flight in corresponding evaluating electronics of the distance-measuring device 25 or by use of the device-control computer 8.

In the example, the distance-measuring device 25 is formed by components of the telescope and by further components. An infrared-light source, which is not explicitly shown in FIG. 2, for example a laser diode, emits infrared radiation in a pulsed manner within a predetermined wavelength range. The emitted infrared radiation, after being focused by transmitting/receiving optics 45, is directed to a surface of the prism 41, which is reflective for the light emitted by the infrared light source, and from there to the dichroic mirror 42, which is reflective for the infrared light from the infrared-light source of the distance-measuring device 25 and, therefore, deflects the infrared light onto the objective 36. The infrared-light source and the transmitting/receiving optics 45 are arranged and formed such that the ray bundle emitted by the infrared-light source is focused along the optical path of the distance-measuring device 25, at a distance from the objective 36 which is the focal width of the objective 36, and thus, a near-parallel ray bundle is emitted by the objective 36, said ray bundle then impinging on a target, such as a reflector, for example a triple mirror, or also a natural target, e.g. the wall of a house. The reflected ray bundle passes back along the same path from the target, via the objective 36, the dichroic mirror 42 and the prism 41, to the transmitting/receiving optics 45, which focus the ray bundle onto a receiving element (not shown in FIG. 2) of the distance-measuring device 25, which detects the radiation. The distance to the target is then determined from the time-of-flight of a pulse between emission and reception, which time-of-flight has been determined by means of a corresponding electronic circuit. Since the ray bundle is emitted along the optical axis of the objective 36, the distance to a target sighted by means of the telescope is determined on the optical axis.

A further device in the telescope unit 5 is constituted by the tracking device or tracker 26, respectively, which serves to automatically sight a reflector located in a target point and to track it, when it is being carried from one point to another. The tracker 26 comprises a transmitter, which emits a narrow bundle of optical radiation; the objective 36 through which the bundle is incident in the direction of transmission and, after reflection from the target, in the receiving direction; receiving optics; a receiver 46, which detects the position of the bundle reflected back by the target and focused onto it by the receiving optics, and a closed-loop control which guides the telescope unit 5 and the alidade 3, respectively, such that the position of the ray bundle reflected back by the target remains constant on the receiver.

More precisely, the transmitter of the tracker 26 comprises a radiation source 47 for emitting optical, preferably infrared, radiation, such as a laser diode, for example, and transmitter optics, which comprise first collimator optics 48 and the prism 41, at the oblique surface of which the ray bundle coming from the source of radiation 47 and collimated by the first collimator optics 48 is reflected in the direction of the optical axis of the objective 36. The receiving optics are formed by the splitting prism 43 and second collimator optics 49. Finally, the receiver 46 comprises several detection elements which are sensitive to the radiation from the transmitter. For the receiver 46, use may be made of a quadrant diode or of a camera circuit, for example.

The transmitter of the tracker 26 transmits the ray bundle, which has been emitted by the radiation source 47, collimated by the first collimator optics 48 and deflected onto the optical axis of the objective 36 by the prism 41, to the target, through the center of the objective 36.

The ray bundle is reflected back to the tachymeter by the target, for example a triple mirror or reflector, respectively, and then enters the telescope unit 5 again, through the objective 36. On its way to the target and back, the ray bundle, which was narrow at first, has broadened so much, at a sufficiently great distance from the target, that it fills the entire diameter of the objective 36 upon its return, so that those parts of the ray bundle; which are not incident on the prism 41 and are further reflected toward the first collimator optics 48 from there, fall onto the dichroic mirror 42. The wavelength of the ray bundle emitted by the transmitter, and the dichroic mirror 42, respectively, is selected such that the ray bundle passes the dichroic mirror 42 without substantial reflection, so that said mirror has practically no influence on said ray bundle. The ray bundle, having passed through the dichroic mirror 42, then enters the receiving optics. First, the ray bundle enters the splitting prism 43. The splitting layer 44 thereof selectively reflects at the wavelength of the radiation emitted by the transmitter, so that it deflects the ray bundle, which has entered the splitting prism 43, in the direction of the second collimator optics 49, but allows visible light to pass. The second collimator optics 49 focus the ray bundle from the transmitter, said bundle having been reflected by the target, onto the receiver 46 of the tracker 26. If the position of the image of the target on the receiver 46 deviates from a predetermined position, e.g. in the center, the tracker supplies a signal concerning amount and direction of such deviation to the device-control computer 8 (not shown in FIG. 1), which controls the drives 28 and 29, so as to rotate the telescope unit 5, together with the alidade 3, if required, such that the image on the receiver 46 is at the predetermined position again, which is in the center in the example.

A further device in the telescope unit 5 is the stacking-out aid 27. The staking-out aid 27 serves, inter alia, to align a movable target in the form of a reflector with the optical axis of the objective 36. The staking-out aid 27 comprises two light emitting diodes 50, a mirror edge 51 and an objective 49'. The light from the light emitting diodes 50, which are arranged behind each other in FIG. 2 and, thus, cannot be shown separately, and among which one emits green light and the other red light, is recombined at the mirror edge 51. In doing so, a light ray is projected to the target point of the tachymeter by the objective 49'. One side of the light ray shines green and the other side red. If a person is present at the target point and looks in the direction of the tachymeter, said person may determine when he or she is on the optical axis of the objective 36 and, thus, of the telescope, by means of the sudden change from one color to the other. Using such a device, it is also possible to modulate data onto the beam from one of the light emitting diodes 50, which should then preferably work in the infrared range, and to transmit said data to the target point.

The important optical systems, i.e. the telescope, the distance-measuring device 25 and the tracker 26, work on the same optical axis, because they all use the objective 36.

The exact sighting of a target with the telescope and, thus, the alignment with the optical axis of the objective 36 are prerequisites to the correct function of the distance-measuring device or the starting of the tracker. However, precise sighting is possible only if the target is represented as a sharp image in the telescope, so that focusing is of particular importance.

For this purpose, according to the prior art illustrated in FIGS. 4 to 6, the focusing lens system or the focusing lens 37, respectively, is adjustable in its position along its optical axis and along that of the objective 36. FIG. 4 shows the actuation of the focusing lens 37 and of its positioning device in the telescope unit 5 in a part-sectional view according to FIG. 2, so that it corresponds to the prior art. The drive device comprises a grooved tube 52 with an inside helical-shaped groove 53, said tube being arranged in the housing 6 of the telescope unit 5 so as to be rotatable about the optical axis, and a lens holder 54, which is guided so as to be linearly movable and comprises a engaging element 55, which is guided in the groove 53 of the grooved tube 52. The grooved tube 52 is rigidly connected with a focusing knob 56 by means of which the grooved tube 52 is rotatable about its own axis. The focusing lens 37 is held in a mount in the lens holder 54 such that its optical axis extends substantially coaxially with the axis of rotation of the grooved tube 52 and, thus, to the optical axis of the objective 36. The lens holder 54 is guided parallel to the optical axis of the telescope on two guide surfaces 57, which are fixedly arranged in the housing 6 of the telescope unit 5 and of which only the rear guide surface can be seen in the sectional view shown in FIG. 4.

FIG. 5 shows the lens holder 54 uncut. At a circular cylindrical portion accommodating the focusing lens 37, the lens holder 54 comprises the linking element 55 formed on a first arm and guiding elements 58 and 58' on a horizontal second arm, the second arm extending parallel to the cylinder axis of the circular cylindrical portion, and at said portion, the guiding elements 58 and 58' contacting the guide surfaces 57. As is evident from FIG. 4, the linking element 55 runs in the groove 53 of the tube 52. FIG. 6 is an uncut representation of the grooved tube comprising the groove 53, which is shown in broken lines and extends in a helical shape around the optical axis, parallel to the guide surfaces 57.

Focusing works as follows: If the operator turns the focusing knob 56, which is arranged at the rear end of the telescope unit 5, the grooved tube 52 is also rotated, so that the linking element 55 running in the groove 53 displaces the lens holder 54 and, thus, the focusing lens 37 along the optical axis of the telescope, because the guide surfaces 57 prevent rotation of the lens holder 54.

This solution for positioning the focusing lens 37 requires a lot of space in the telescope and makes it difficult to provide a modular construction. Due to the relatively high torque required to adjust the grooved tube 52, this solution is hardly suitable for a motor drive.

In order to achieve a high working speed, it is desirable, in particular, to have a backlash-free movement of the focusing lens 37.

A tachymeter according to a preferred embodiment of the invention differs from the tachymeter shown in FIGS. 1 to 3 by the positioning of the focusing lens or the focusing lens system, respectively. Said adjustment is motor-driven and practically backlash-free. For this purpose, the positioning device for the focusing lens is replaced by a positioning device according to a preferred exemplary embodiment of the invention also termed servo focus. As before, the term focusing lens will be used below which can mean either an individual lens or a lens system.

Figure 7:
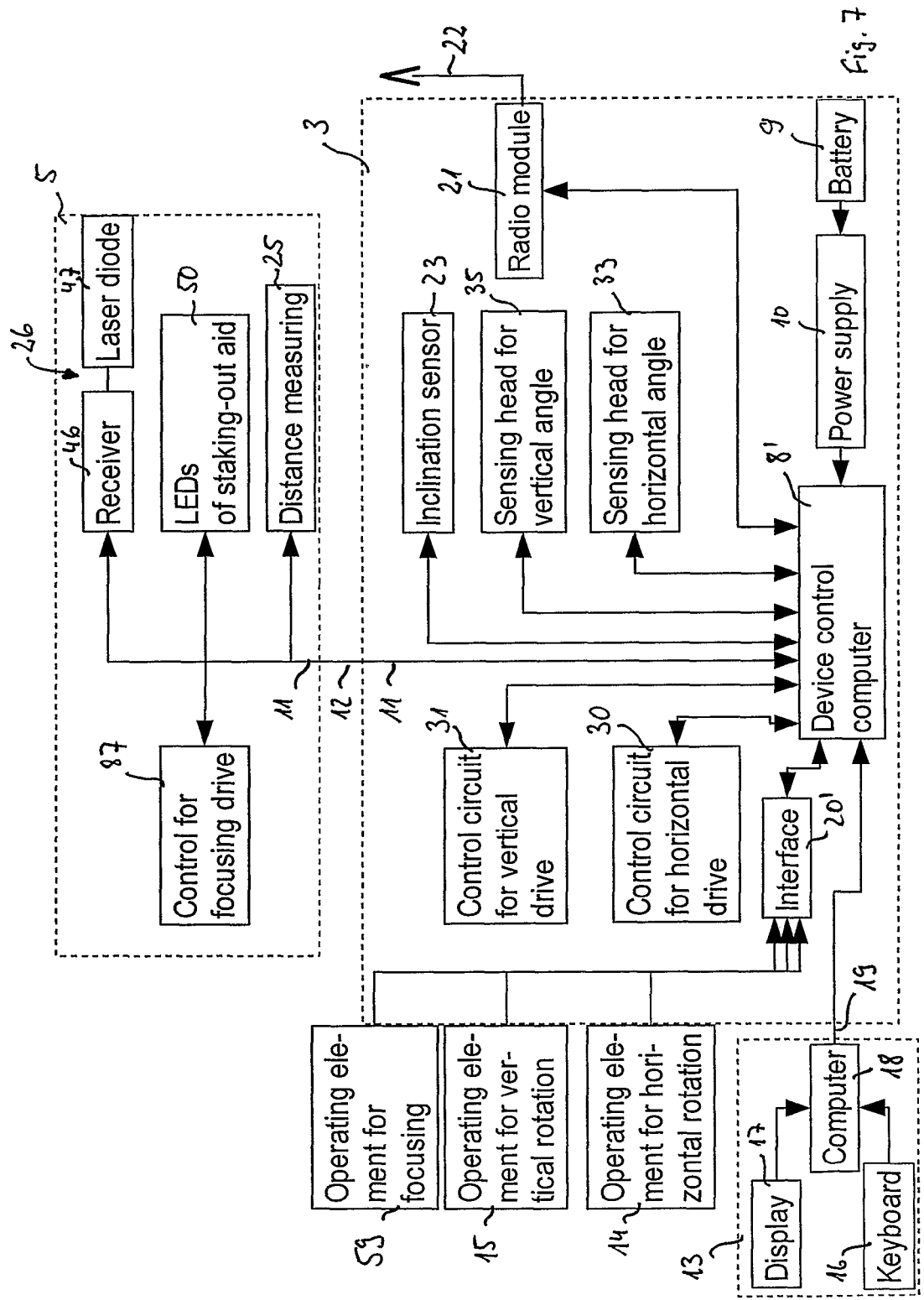
FIG. 7 shows a simplified block diagram of a tachymeter according to a preferred embodiment of the invention.

The tachymeter according to the preferred embodiment of the invention differs from the above-described tachymeter, first, by the holder and the drive of the focusing lens 37 and, second, by a modified device-control computer 8'. Furthermore, an operating element 59, which is connected to the device-control computer 8' via an interface 20', is provided to control focusing (cf. FIG. 7). This interface 20' differs from the interface 20 only in that it can additionally sense the position of the operating element 59 and output it to the device-control computer 8'. All other components of the tachymeter are unchanged as compared to the above-described tachymeter, so that the same reference numerals are used for them and the explanations given with regard to said components also apply here.

FIG. 8 shows a perspective image of a positioning device according to a preferred embodiment of the invention, which serves to move the focusing lens 37 or to adjust the position of the focusing lens 37 along the optical axis of the focusing lens 37 or along the optical axis of the objective 36, respectively, indicated by a dashed line. The positioning device can be incorporated in the housing 6 of the telescope unit 5 as a modular unit or, in another embodiment, may be formed directly in the housing 6.

The positioning device comprises a drive portion including a motor, a portion to transform a rotation into a translation and a guiding portion, all of which have common parts. These portions represent preferred embodiments of the invention in themselves.

The positioning device has a frame 60, which is securely connected to the housing 6 of the telescope unit 5 and has the immobile parts of the positioning device either fixed thereto or provided thereon. To provide a rough outline, the positioning device comprises a motor 61, more precisely an electric motor, which rotates a threaded spindle 63 as a shaft via a coupling 62, the rotation of said threaded spindle 63 being converted to a linear movement by a body 64, through which the threaded spindle 63 extends and which is secured against rotation about the longitudinal axis of the threaded spindle 63, said body 64 comprising an internal thread 89 engaging the thread 70 of the threaded spindle 63. The thread 70 on the spindle 63 and the internal thread 89 of the body represent engagement structures and complementary engagement structures of the spindle 63 and the body 64, respectively, which are in engagement to transform a rotation of the spindle into a linear movement of the body 64 secured against rotation. The linear movement is transmitted, via an elastic coupling member 65, which is held on the body 64, to a member to be positioned, in the form of a lens holder 66 which holds the focusing lens 37. Adjustability of the position of the focusing lens 37 only along its optical axis is achieved by the special guiding of the lens holder 66, wherein the lens holder 66 is guided in a direction parallel to the optical axis by a first guide 67 and a second guide 68 and the longitudinal axis of the threaded spindle 63 also extends parallel to the optical axis.

The drive portion comprises the motor 61, including a driving shaft 69, the spindle 63 with an engaging structure in the form of the external thread 70 having constant pitch, the coupling 62, which resiliently and/or elastically couples a first end 71 of the threaded spindle 63 with the motor 61 or with its drive shaft 69, respectively, rigidly with respect to rotations, and a support assembly supporting the spindle elastically at the frame 60. The support assembly comprises a bearing 72 and two elastic elements. The bearing 72 is held in a bearing seat 73 in the frame 60 by the two elastic elements in the form of elastic O-rings 74 and 75 and receives a second end 76 of the threaded spindle 63.

The threaded spindle 63 is elastically supported, at its first end 71, on the driven shaft 69 of the motor 61, via the coupling 62, and, at its second end 76, via the bearing 72 and the elastic elements or O-rings 74 and 75, respectively, so that vibrations in axial and/or radial direction are not transmitted unrestrictedly between the motor 61 and the threaded spindle 63 or between the threaded spindle 63 and the frame 60, respectively.

Figure 9:
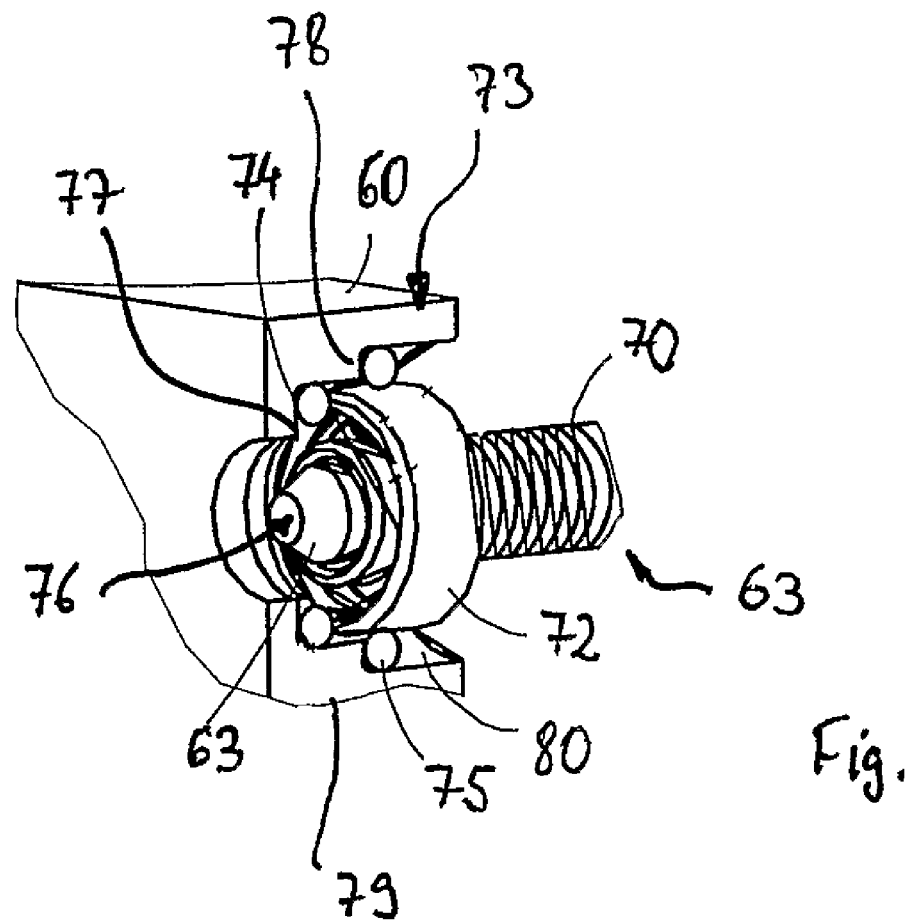
FIG. 9 shows a perspective view, in partial section, of a second end of a threaded spindle in the device of FIG. 8, said second end being supported in a frame.

As shown in more detail in FIG. 9, the bearing 72 is a conventional rolling bearing with a circular, cylindrical casing, said bearing being fitted on the second end 76 of the threaded spindle 63.

The bearing seat 73 has a circular cross-section and comprises a contacting surface 77, which is directed transversely of the spindle axis of the threaded spindle 63, as well as a circumferential shoulder 78, resulting in a first cylindrical portion 79 having a smaller diameter and in a second cylindrical portion 80 having a larger diameter. The diameter of the first cylindrical portion 79 is selected to be slightly larger than the external diameter of the bearing 72, so that the latter can move in the radial and axial directions within the first cylindrical portion. The elastic O-ring 74 is clamped between the front face of the bearing 72 and the contacting surface 77 such that it biases the threaded spindle 63 towards the motor 61. The O-ring 74 restricts the vibrational movements of the bearing 72 and, consequently, of the spindle 63 supported by it, relative to the bearing seat 73 in axial direction of the spindle 73, and preferably damps them As the O-ring 74, use may be made, for example, of a O-ring of silicone caoutchouc (VMQ) having a Shore A hardness of 70, such as that available from C. Otto Gehrckens GmbH & Co. KG Dichtungstechnik, D-25421 Pinneberg, Germany.

The second O-ring 75, which is clamped between the internal wall of the second cylindrical portion 80 in the bearing seat 73 and the circumferential surface of the bearing 72, is provided to elastically support the threaded spindle 63 in a radial direction. The internal diameter of the second cylindrical portion 79 and the diameter of the cross-section of the O-ring 75 are selected depending on the external diameter of the bearing 72 such that the bearing 72 slightly compresses the O-ring 75. As the O-ring 75, use may be made, for example, of a O-ring of silicone caoutchouc (VMQ) having a Shore A hardness of 50, such as that available from C. Otto Gehrckens GmbH & Co. KG Dichtungstechnik, D-25421 Pinneberg, Germany.

The materials of the O-rings 74 and 75 are selected such that, on the one hand, in the axial direction of the threaded spindle no backlash can occur that prevents exact adjustment of the lens holder 66 in the direction of the longitudinal axis of the threaded spindle 63, and yet, on the other hand, during operation of the motor, in particular during a short-term movement, vibrations, in particular in the audible frequency range, are not transmitted unrestrictedly between the frame 60 and the threaded spindle 63.

In another embodiment, blocks made of an elastic material may also be used instead of the O-rings, in which case a radially symmetrical arrangement of the blocks forming elastic elements in the sense of the invention, on the periphery and on the front face of the rolling bearing ring is recommendable.

FIG. 10 shows a drive-side section of the coupling 62 and the motor 61 in an exploded perspective view. This coupling, which is arranged between the drive shaft 69 of the motor 61 and the threaded spindle 63, enables vibration damping, backlash-free and slip-free transmission of a rotary movement between the motor 61 and the threaded spindle 63.

A first coupling part 81 comprises an opening, in its bottom part, for receiving the end of the drive shaft 69 of the motor 61, which is flattened to avoid slip. On said bottom part, there are arranged four resilient tongues 82, which extend substantially orthogonal to the bottom or parallel to the drive shaft 69, respectively, and form a square socket. Said first coupling part 81 may be made of plastics, for example. The first coupling part 81 is made by injection molding of a glass fiber-reinforced plastic material, which, in the example, is a glass fiber-reinforced polycarbonate including 20% by weight of glass fibers, such as that offered by Bayer AG, Leverkusen, Germany, designated as Makrolon PC-GF25.

A second coupling part 83, which is formed by a pin 84 and two elastic O-rings or elastic discs 85 fitted on the opposite ends of the pin, is inserted into said square socket. The O-rings 85 represent elastic transmission elements. The diameter of the O-rings 85 is selected such that, in the assembled condition, the second coupling part 83 is fitted in the square socket of the first coupling part 81 in a form-locking and backlash-free manner, so that the drive shaft 69 and the spindle 63 are rigidly coupled with respect to rotations and rotations of the drive shaft 69 can be transmitted to the threaded spindle 63 without backlash. Although, in the present example, the pin 84 is a metal pin and the O-rings 85 are made of a plastic material, it is also possible, in another embodiment, to manufacture the second coupling part in one piece from a suitable plastic material. As the O-rings 85, use may be made, for example, of O-rings of acrylonitrile butadiene caoutchouc (NBR) having a Shore A hardness of 70, such as those available from C. Otto Gehrckens GmbH & Co. KG Dichtungstechnik, D-25421 Pinneberg, Germany.

As shown in FIGS. 11 and 12, the threaded spindle 63 has a groove 86 with outwardly diverging sidewalls, in the example a V-groove, at its drive-side end or first end 71, which serves for coupling to the second coupling part 83, said groove 86 being cut in the axial direction and extending transversely across the cross-section of the threaded spindle 63. FIG. 12 shows a sectional view of part of the motor 61, of the coupling 62 and of the first end 71 of the threaded spindle 63. The first coupling part 81 is fitted onto the flattened end of the drive shaft 69 of the motor 61. The second coupling part 83 is fitted in the square socket of the first coupling part 81 in a backlash-free and form-locking manner, with the pin 84 of the second coupling part 83 engaging with the V-shaped groove 86 of the threaded spindle 63 and thus allowing the rotary movement of the motor 61 to be transmitted to the threaded spindle 63 without backlash in both directions of rotation. There is no transmission or only strongly damped transmission of radial vibrations from the motor 61 or from the drive shaft 69 of the motor to the threaded spindle 63, because the second coupling part 83 can compensate for tilting of the driven shaft 69 relative to the threaded spindle 63 in combination with the V-shaped groove 86 in the first end 71 of the threaded spindle 63.

The interaction between the elastic support of the bearing 72 and, thus, of the threaded spindle 63 at its second end 76, and the movable support at the drive-side, first end 71 allows the threaded spindle 63 to be driven with low noise and free from backlash in the direction of rotation. Preferably the materials are chosen to the effect that pulse-like rotation movements, i.e. rotation movements of very short durations or by small angles, do not cause excessive noise.

The noise reduction may be due to at least one of the following effects, which often occur together, however. On the one hand, using elastic elements with elastic constants that differ substantially from those of the drive shaft 69 and of the threaded spindle 63 results in a certain decoupling with respect to vibrations in axial and/or radial direction at the ends of the threaded spindle 63, which decoupling may hinder the propagation of vibrations or the occurrence of sharp resonances. On the other hand, the elastic elements, i.e. the O-rings 74 and 75 and the O-rings 85, each have their own damping of vibrations. Not only does this hinder the propagation of vibrations, but it also achieves damping of said vibrations.

For operation of the motor 61 (cf. FIG. 7), there are provided the operating element 59 in the form of an angle encoder, which is connected to the device-control computer 8' via the interface 20', and a control unit 87 for the focusing drive, which control unit is controllable by the device-control computer 8', is arranged in the telescope unit 5 and serves to control the motor 61. The motor 61 is preferably a stepping motor. In order to adjust the focus, a person operates the operating element 59 for the servo-focus or positioning device, whose position is reported to the device-control computer 8' via the interface 20'. Thereupon, the device-control computer 8' passes a corresponding instruction, via the bus 11, to the control unit 87, which in turn positions the motor 61 according to the settings on the operating element 59. In this case, the number of steps defined for the motor 61 may be stored in the control unit 87 or in the device-control computer 8'. It is also possible to determine the start and/or end position of the focusing lens 37 and, thus, the start and end positions of the motor 61 by means of sensors, which are not shown here. Such sensors are known and are therefore omitted in the Figures. These may be, for example, light barriers, which sense the position of the lens holder 66 or of a part connected thereto in said positions. In another embodiment, instead of an angle encoder, a rotary potentiometer may be used.

The portion of the positioning device for transforming a rotation of the spindle to a linear motion of the body is partly shown in FIGS. 13 and 14. It comprises the threaded spindle 63, the body 64 with an opening 88 and, as a complementary engaging structure, an internal thread 89, which engages with the engaging structure, in this example the external thread 70 of the threaded spindle 63 extending through the opening 88, the elastic coupling member 65, which is held on the body 64, the lens holder 66 as a member to be positioned, as well as the first linear guide 67 which is fixed with respect to the frame 60 and on which the lens holder 66 is guided. In the present example, the first guide 67 is provided as a cylindrical guiding rod, which extends parallel to the threaded spindle 63, the longitudinal symmetry axis of the guiding rod being a first guiding axis.

The lens holder 66 shown in FIGS. 8 and 20 has an elongated shape and comprises a cylindrical portion at its first section or end 90, which is the top end in the Figures, said cylindrical portion comprising a guide opening 91 extending transversely of the longitudinal direction of the lens holder 66 and receiving the guiding rod 67, so that the lens holder 66 is linearly movable along the direction of the guiding rod 67 and, thus, along the axis of the threaded spindle 63 and, as long as only the first guide 67 is considered, is also pivotable about it. Therefore, the peripheral surface of the guiding rod 67 forms a guiding surface 92 of the first guide 67.

The lens holder 66 further has a mount 93 for receiving the focusing lens 37, which is arranged such, relative to the guiding opening 91, that the longitudinal axis of the guiding opening 91 extends parallel to the optical axis of the focusing lens 37 held in the lens holder 66.

This is followed by the second section or end 94 of the lens holder 66, at which a rolling bearing 95 is arranged (cf. FIG. 21.)

In the cylindrical portion of the lens holder 66, at its first end on the side facing the threaded spindle 63, a groove 96 with outwardly diverging sidewalls, in the example a V-shaped groove, is formed, which extends transversely of the longitudinal axis of the guiding opening 91 and, thus, of the guiding direction of the first guide 67.

The body 64, combined with the elastic coupling member 65 held thereon, serves to transmit the rotary movement of the threaded spindle 63 to the lens holder 66.

The body 64 comprises, in a block 97, a threaded sleeve 98 which protrudes out of said block and whose internal thread 89 forming a complementary engaging structure engage with the engaging structure of the spindle 63, i.e. the external thread of the threaded spindle 63. The block 97 may be manufactured from a suitable plastic material, for example a polycarbonate reinforced with short glass fibers. In particular, use may be made, for this purpose, of the Makrolon PC-GF 30, a polycarbonate having 30% by weight of glass fibers as offered by Bayer AG, Leverkusen, Germany. However, use may also be made of other plastic materials, which are preferably very rigid. Thus, in particular, industrial plastics, such as polyamides, polyether ketone, polyetherether ketones, polyoxymethylene or also liquid-crystal polymers, may be employed.

The threaded sleeve 98 is slid into the block 97 after its manufacture or preferably molded into it when the body is formed by injection molding. The body 64 further has, at its lower side in the Figures, a recess 99 shaped like a segment of a circle, whose shape corresponds to that of the first guide 67, i.e. of the guiding rod. The recess 99 is formed such that the body 64 is guided on the first guide 67, so that said guide has a rotation-locking effect, which prevents simultaneous rotation of the body 64 when rotating the threaded spindle 63.

On both sides of the body 64, there extend grooves 100 for receiving the resilient coupling member 65, said grooves being arranged relative to the recess 99 so as to extend substantially parallel to a plane through the threaded spindle 63 and the guiding rod 67, when the body 64 is mounted.

The elastic coupling member 65 has a U-shaped portion 101, by which it is snapped or fitted; respectively, onto the body 64, with two arms of said "U" extending within the grooves 100 of the body 64. Adjoining said U-shaped portion at an angle of about 80° to 90°, there is an L-shaped arm 102 whose leg connected with the U-shaped portion 101 extends approximately in the direction of the first guide 67 or of the threaded spindle 63, respectively, and whose second arm, which forms a free end, extends transversely of the first guide 67 or substantially parallel to the V-shaped groove 96 in the lens holder 66. The elastic coupling member 65, which is manufactured from spring steel, is dimensioned such that, in the built-in condition, the L-shaped resilient arm 102 is urged into the V-shaped groove 96 of the lens holder 66 by its leg at the free end. In doing so, the elastic or resilient arm 102 is deformed, in particular, in a plane which does not extend through the axis of the internal thread 89 of the body 64.

This design of the body 64 has several effects. On the one hand, a torque is exerted on the body 64 and, thus, on the threaded sleeve 98 or the internal thread 89 therein, which tilts the body 64 at a small angle relative to the threaded spindle 63. In a simplified sectional view, FIG. 15 shows the position of the internal thread 89 of the threaded sleeve 98 relative to the external thread 70 of the threaded spindle 63, when the threaded sleeve 98 and the threaded spindle 63 are tilted relative to each other at a small angle. For better illustration, the size of the small angle is exaggerated in the Figure. Said tilting of the threaded sleeve 98 and, thus, of the body 64 on the threaded spindle 63 removes the backlash of the threads in that the external thread flanks of the external thread 70 of the threaded spindle 63 contact the thread flanks of the internal thread 89 of the threaded sleeve 98 in a manner free from backlash. This has the result that, independently of the direction of rotation of the threaded spindle 63 or of the direction of displacement of the body 64, it is always the same flanks of the external thread of the threaded spindle 63 and of the internal thread of the body 64 that contact each other, so that, along the optical axis of the focusing lens 37, a drive is achieved which is free from play and backlash.

Further, transmission of the movement of the body 64 to the lens holder 66 is achieved by alignment of that leg of the L-shaped arm 102 of the elastic coupling member 65 which is connected to the U-shaped portion 101 of the coupling member 65. This drive is also free from play and backlash due to the combination of form- and force-locking. Moreover, the lens holder 66 is urged against the first guide 67, so that a possible backlash is prevented here, too. In particular, by accordingly selecting the material of the elastic coupling member 65, its dimensions and the arrangement of the threaded spindle 63 relative to the first guide 67, the spring force of the free end of the coupling member 65 acting on the V-groove 96 can be chosen such that, even when reversing the direction of rotation of the threaded spindle 63, there is no backlash, between the body 64 and the first guide 67 securing the body 64 against rotation with rotation of the spindle 63, that could impair the rotation-locking action of the first guide 67.

Since the elastic coupling member 65 does not engage the V-shaped groove 96 symmetrically, but in a plane which is laterally offset relative to the spindle axis, a torque may further be applied to the lens holder 66 for rotation about an axis essentially orthogonal to the spindle 63, said torque pivoting the lens holder 66 toward the second guide 68.

FIG. 16 shows another embodiment of the body 64, in which the threaded sleeve 103 is shortened. This results in reduced friction between the internal thread of the threaded sleeve 103 and the external thread of the threaded spindle 63, so that adjustment requires only lesser torques.

FIG. 17 shows a body according to a further embodiment, wherein the threaded sleeve 104 comprises two spaced apart thread portions 105, which are separated by a portion 106 having no thread. Such a body has the advantage that, although the overall length of the threaded sleeve 104 provides very good guiding on the threaded spindle 63, a lower number of turns of the thread engage with each other, which allows to considerably reduce friction between the turns of the external thread of the threaded spindle 63 and of the internal thread of the threaded sleeve 104.

FIG. 18 shows a body 107 according to a further embodiment, which differs from the body 64 in that the elastic coupling member is integrated. The block 97' now comprises an integrated elastic coupling member 108 in the form of an L-shaped arm which is formed in a similar manner as the arm 102 of the coupling member 65. Both form one single component, which can be advantageously manufactured by pressing, in particular by casting or injection molding, respectively, if a suitable plastic material is used. In this case, use is preferably made of a plastic material which has no or only very little tendency to creep or flow, respectively, at the operating temperatures to be expected, so that the resilient property of the coupling member 108 is not reduced to a functionally noticeable extent, even after long-lasting deformation. For this purpose, use can be made preferably of plastics having a high glass temperature and, in particular, of semi-crystalline plastics. Further, fiber-reinforced plastics, e.g. glass fiber-reinforced polycarbonate, can be used.

FIG. 19 shows a further embodiment of a body which, like the body in FIG. 18, comprises a block with an integrated resilient member 108, wherein a threaded sleeve 103 with a shortened length is arranged, however, in this case.

In another embodiment, shown in FIG. 20 in a front view, the body 64' differs from the body of the embodiments in FIGS. 13, 14, 16 and 17 in that it has a projection 114 on that side on which the grooves are located, said projection 114 protruding from that side of the body 64 which is adjacent to the arm 102 and behind which the arm 102 is located. The projection in this embodiment prevents the arm 102 from slipping from the body 64 during mounting of the coupling member 65.

The guiding portion of the positioning device, which comprises the first guide 67, the second guide 68, as a member to be positioned the lens holder 66 with the rolling bearing 95 held thereon, and a magnet device having a magnet 109 attached to the lens holder 66, serves to guide the lens holder 66 (cf. FIG. 21).

As described before, the first, upper end 90 of the lens holder 66 with the guiding opening 91 is guided on the first guide 67. The second end part 94 of the lens holder 66 is guided on the second guide 68. This purpose is served by the rolling bearing 95, which is arranged at the second end of the lens holder 66 and whose axis of rotation extends in a direction essentially orthogonal to the longitudinal axis of the guiding opening 91.

Further, the magnet 109 whose dipole forms an angle of about 30° with the longitudinal axis of the lens holder 66, i.e. with the axis of rotation of the rolling bearing 95, is arranged in the section of lens holder 66 forming the mount 93.

The second guide 68 is arranged on the frame 60, parallel to the first guide 67. It has a guiding surface 111 extending parallel to the first guide axis or first guide 67. The normal to the guiding surface 11 is approximately orthogonal to a plane through the longitudinal axis of the first guide 67 and to the optical axis 0 of the focusing lens 37 (cf. FIG. 21) and which extends over the possible path of displacement of the lens holder 66 in the direction of the first guide 67. As shown in FIG. 21, the rolling bearing 95 with its circular, cylindrical outer casing can, therefore, roll on the guiding surface 111, when the lens mount 66 is guided along the first guide 67.

On the second guide 68, in the longitudinal extension thereof, i.e. parallel to the direction of the first guide 67, there is mounted an armature plate 110, which is made of a soft-magnetic material, e.g. a ferromagnetic material, preferably iron. A normal N to the armature plate 110 forms an angle φ of about 30°, together with the guiding surface 111, and is aligned in the direction of the dipole of the magnet 109. Depending on its design and intended use, the armature plate 110 may extend at least over the entire length of the second guide 68 actually used for guiding.

The threaded spindle 63, the first guide 67 and the second guide 68 or its guiding surface 111, respectively, are arranged such, relative to the lens holder 66, that they are parallel to the optical axis of the focusing lens 37 held in the lens holder 66.

A force-locking connection between the lens holder 66 and the armature plate 110 and, thus, the second guide 68, effected by magnetic force is realized by the magnet 109, which is held on a the lens holder 66 adjacent the armature plate 110, and the armature plate 110. In order to avoid additional friction between the armature plate 110 and the magnet 109, a small air gap 112 is provided between said two parts (cf. FIG. 21), which may be about 0.5 mm wide, for example.

Guiding of the lens holder 66 on the first guide 67 in the form of a guiding rod with circular cross-section allows two degrees of freedom for a movement of the lens holder 66: on the one hand, linear displacement along the first guide 67 and, thus, along the optical axis of the focusing lens 37 or of the objective 36, respectively, and, on the other hand, a pivotal movement about the longitudinal axis of the first guide 67, which could, however, destroy the alignment of the optical axis of the focusing lens 37 and of the objective 36 on each other.

This degree of freedom is removed by the second guide 68, the magnet 109 and the armature plate 110. Due to the above-described arrangement of the magnet 109 relative to the longitudinal axis of the lens holder 66 and the orientation of the armature plate 110, the force between the magnet 109 and the armature plate 110 extends approximately at an angle of 30° to the guiding surface 111 and, thus, in a plane through the threaded spindle 63 and the first guide 67. This has the effect that a force or a torque is generated which pulls the second end 94 of the lens holder 66 with the rolling bearing 95 toward the guiding surface 111 of the second guide 68. This leads to guiding at the second end on the second guide 68 or on its guiding surface 111, respectively, free from backlash. Moreover, the positioning device may be rotated together with the telescope unit 5 around any desired angles, in particular also around 180°, without losing the backlash-free guidance.

At the same time, the lens holder 66 is pulled onto the first guide 67 with its guiding opening 91, so that backlash is avoided between the lens holder 66 and the first guide, i.e. the guiding rod 67, in the guiding sleeve 91. Thus, a corresponding tilting of the optical axis of the focusing lens 37 relative to the longitudinal axis of the threaded spindle 63 or of the optical axis of the objective 36, respectively, which might lead to partially unfocussed images, can be avoided.

The use of the rolling bearing 95, which is pulled toward the second guide 68 and then contacts it, strongly reduces friction between the second end of the lens holder 66 and the guiding surface of the second guide 68.

In another embodiment, the second guide 68 itself may be provided as a magnet, in which case a ferromagnetic armature element is then arranged on the lens holder 66 or is constituted by it.

It is also well-conceivable to provide the magnet 109 as an electromagnet, which has the advantage, among others, that the magnetic force can be varied by changing the flux of magnetization.

Moreover, the angle φ, which may assume, for example, any values between 0° and 90° other than 30°, may also be changed. The magnet 109 is then preferably mounted on the lens holder 66 in such a manner that its dipole further approximately registers with the normal to the armature plate 110.

In another embodiment, the armature element 110 is replaced by a longitudinal extending magnet of the same dimensions as the armature element 110 and the magnet 109 is replaced by a ferromagnetic armature element of the same shape as the magnet 109.

Alternatively, the respective part of the lens holder may be formed from a ferromagnetic material such as iron.

In yet another embodiment of the positioning device illustrated in FIG. 22, the O-rings 74 and 75 are not arranged between the bearing seat 73 and the bearing 72, but between the threaded spindle 63 and a seat in the bearing which may then be held rigidly in the bearing seat 73 of the frame.

Moreover, as an alternative to the elastic coupling 62, or in addition, the motor 61 may be held elastically on the frame 60, for which purpose, for example, an elastic element 113 may be provided between mounting means on the motor 61 and the frame 60 (cf. FIG. 23).

The complementary engaging structure of the body 64 does not need to be a thread. In an alternative embodiment of the positioning the body 64" schematically shown in FIGS. 24 and 25 differs from one of the embodiments of the body 64 mentioned above in that it comprises as a complementary engaging structure two protrusions formed by pins 115 held in the body 64" and extending in a radial direction into the through hole 116 of the body 64" receiving the threaded spindle 63. The pins 115 are spaced apart from each other in a direction along the spindle 63 and extend into the through hole 116 in opposite radial directions. A tilting of the body 64" has the same effect as in the case of an internal thread as a complementary engaging structure. For each direction along the spindle 63 one of the pins 115 contacts a section of the rib or walls of grooves of the thread of the spindle 63 essentially facing in the opposite direction, so that a backlash-free movement in both directions is obtained.

In a further embodiment shown in FIGS. 26 and 27, as a complementary engaging structure as protrusions pins 117 are arranged in the through hole 116 extending into the through hole 116 in a direction tangential to the spindle 63 engaging with the thread of the spindle 63. Also these pins 117 are spaced apart with respect to each other along the direction of the spindle 63 and provided at opposite radial positions with respect to the longitudinal axis of the spindle 63.

In yet another embodiment, instead of the pins 117 a corresponding rib could be formed in the body.

Further, the engaging structure of the spindle 63 does not need to be a thread. As shown in FIGS. 28 and 29, a spindle 63' may comprise two protrusions in the form of pins 118 extending in opposite radial directions from the spindle 63' and being spaced apart with respect to each other along the spindle 63' instead. The pins 118 are provided with a tip engaging with the internal thread of the body 64. The pins 118 may be press-fit in corresponding holes in the spindle 63'.

In another embodiment, in the tachymeter the eye-piece is replaced by a video-sensor part of a video-camera, the complete camera being formed by the objective 36, the focusing lens 37 and the video-sensor part.

The positioning device according to the invention may also be employed for other purposes than for tachymeters or, more generally, optical instruments, wherein the lens holder 66 may be replaced by another element to be positioned.

However, it is self-evident to the person skilled in the art that changes and modifications can be performed without deviating from the scope of the following claims.

The invention claimed is:

1. A positioning device comprising a frame (60);
a motor (61) having a drive shaft;
a spindle (63; 63') having a first end (71) and a second end (76) and being rotatable in relation to the frame (60);
a coupling (62) resiliently connecting said drive shaft to said first end (71) of said spindle (63; 63') such that the spindle (63; 63') rotates when the drive shaft of the motor (61) rotates, wherein the coupling (62) comprises at least one elastic transmission element (85); and
a support assembly (72, 74, 75; 113) elastically supporting at the frame (60) at least one of the second end (76) of the spindle (63; 63') and the motor (61), wherein an O-ring (74, 75) or an elastic disc (74, 75) of the support assembly (72, 74, 75) and/or an elastic transmission element (85) bias the drive shaft (69) and the spindle (63; 63') towards each other.

2. The positioning device according to claim 1, wherein the support assembly (72, 74, 75; 113) has vibration-damping properties.

3. The positioning device according claim 1, wherein the support assembly (72, 74, 75) comprises an elastic bearing assembly (72, 74, 75), which supports the second end (76) of the spindle (63; 63') in the frame (60).

4. The positioning device according to claim 3, wherein the elastic bearing assembly (72, 74, 75) comprises a bearing (72) mounted at the frame (60) and at least one elastic element (74, 75) arranged between the second end (76) of the spindle (63; 63') and the bearing (72) or between the bearing (72) and the frame (60).

5. The positioning device according to claim 4, wherein at least a section of the elastic element (74) is clamped in an axial direction of the spindle (63; 63').

6. The positioning device according claim 4, wherein at least a section of the elastic element (75) is clamped in a radial direction of the spindle (63; 63').

7. The positioning device according claim 4, wherein the elastic element (74, 75; 113) is made of an elastomeric material.

8. The positioning device according to claim 4, comprising two or more elastic elements (74, 75) arranged symmetrically with respect to the spindle (63; 63').

9. The positioning device according to claim 4, wherein the elastic element (74, 75; 113) is one of the following: an O-ring, a block and a cup-shaped form.

10. The positioning device according to claim 4, wherein the bearing (72) is a rolling bearing.

11. The positioning device according to claim 1, wherein the coupling (62) rigidly couples the drive shaft (69) and the spindle (63; 63') with respect to rotation of the drive shaft (69) and wherein the coupling (62) is connected to the spindle (63; 63') in such a manner that the spindle (63; 63') can be tilted with respect to an axis of rotation of the drive shaft (69).

12. The positioning device according to claim 1, wherein the spindle (63; 63') comprises a groove (86) at the first end (71) in a direction orthogonal to an axis of rotation of the spindle (63; 63'), wherein the groove (86) has sidewalls which are at least partially diverging and wherein the coupling (62) comprises one of a pin (84) or an edge connected to the elastic transmission element (85) and engaging with the groove (86) in a backlash-free manner.

13. The positioning device according to claim 1, wherein the coupling (62) comprises a first coupling part (81) rigidly connected to the drive shaft (69) and a second coupling part (83) comprising the elastic transmission element (85) and being connected to the spindle (63; 63').

14. The positioning device according to claim 13, wherein the second coupling part (83) is connected to the first coupling part (81) by a form-fit or interlocked connection.

15. The positioning device according to claim 13, wherein the first coupling part (81) comprises a square socket at its end facing the spindle (63; 63').

16. The positioning device according to claim 13, wherein the second coupling part (83) comprises a pin (84), on each end of which there is arranged an elastic 0-ring (85) or an elastic disc (85).

17. The positioning device according to claim 1, wherein the spindle (63; 63') has an outside engaging structure (70; 118) and the positioning device further comprises:
a positioned member (66);
a body (64; 64'; 64"; 107) being movable along the spindle (63; 63') and having a complementary engaging structure (89; 115; 117) engaging with the engaging structure (70; 118) of the spindle (63; 63') to transform a rotation of the spindle (63; 63') into a translation of the body (64; 64'; 64"; 107) when the body (64; 64'; 64"; 107) is secured from being rotated by the spindle (63; 63');
a securing element (67) for securing the body (64; 64'; 64"; 107) from being rotated by the spindle (63; 63'); and
an elastic coupling member (65; 108) exerting a torque to tilt the body (64; 64'; 64"; 107) relative to the spindle (63; 63') and transmitting a movement of the body (64; 64'; 64"; 107) to the positioned member (66).

18. The positioning device according to claim 1, further comprising
a positioned member (66);
a first guide (67) for guiding a first section (90) of the positioned member (66) along a first guiding axis;

a second guide (68) having a guiding surface (111) extending parallel to the first guiding axis and for guiding a second section (94) of the positioned member (66); and
a magnet device (109) biasing the second section (94) of the positioned member (66) towards the guiding surface (111) of the second guide (68).

19. The positioning device according to claim 1, wherein the spindle (63; 63') has an outside engaging structure (70; 118) and the positioning device further comprises:
a positioned member (66),
a body (64; 64'; 64"; 107) being movable along the spindle (63; 63') and having a complementary engaging structure (89; 115; 117) engaging with the engaging structure (70; 118) of the spindle (63; 63') to transform a rotation of the spindle (63; 63') into a translation of the body (64; 64'; 64"; 107) when the body (64; 64'; 64"; 107) is secured from being rotated by the spindle (63; 63'),
a securing element (67) for securing the body (64; 64'; 64"; 107) from being rotated by the spindle (63; 63'),
an elastic coupling member (65; 108) exerting a torque to tilt the body (64; 64'; 64"; 107) relative to the spindle (63; 63') and transmitting a movement of the body (64; 64'; 64"; 107) to the positioned member (66),
a first guide (67) for guiding a first section (90) of the positioned member (66) along a first guiding axis,
a second guide (68) having a guiding surface (111) extending parallel to the first guiding axis and for guiding a second section (94) of the positioned member (66); and
a magnet device (109) biasing the second section (94) of the positioned member (66) towards the guiding surface (111) of the second guide (68).

20. A positioning device comprising:
a positioned member (66);
a rotatable spindle (63; 63') having a spindle axis and an outside engaging structure (70; 118);
a body (64; 64'; 64"; 107) being movable along the spindle (63; 63') and having a complementary engaging structure (89; 115; 117) engaging with the engaging structure (70; 118) of the spindle (63; 63') to transform a rotation of the spindle (63; 63') into a translation of the body (64; 64'; 64"; 107) when the body (64; 64'; 64"; 107) is secured from being rotated by the spindle (63; 63');
a securing element for securing the body (64; 64'; 64"; 107) from being rotated by the spindle (63; 63'); and
an elastic coupling member (65; 108) exerting a torque to tilt the body (64; 64'; 64"; 107) against the spindle axis and transmitting a translational movement of the body (64; 64'; 64"; 107) to the positioned member (66).

21. The positioning device according to claim 20, wherein said engaging structure (70) of the spindle (63; 63') comprises at least one groove (70) winding about the spindle (63; 63').

22. The positioning device according to claim 20, wherein said engaging structure (70) comprises an outside thread formed on the spindle (63; 63').

23. The positioning device according to claim 20, wherein said complementary engaging structure (89; 115; 117) of said body (64; 64'; 64"; 107) comprises at least one protrusion (115; 117) or rib.

24. The positioning device according to claim 20, wherein said complementary engaging structure (89; 115; 117) of said body (64; 64'; 64"; 107) comprises at least two protrusions (115; 117) or two ribs being arranged in opposition with respect to a radial direction of the spindle (63; 63').

25. The positioning device according to claim 20, wherein said complementary engaging structure (89; 115; 117) of said body (64; 64'; 64"; 107) comprises at least one thread (89).

26. The positioning device according to claim 20, wherein said complementary engaging structure (89; 115; 117) of said body (64; 64'; 64"; 107) comprises at least two ribs or grooves running in parallel.

27. The positioning device according to claim 20, wherein said engaging structure (118) of the spindle (63; 63') comprises at least one protrusion (118) or at least one rib on an outer surface of the spindle (63; 63').

28. The positioning device according to claim 20, wherein the engaging structure (70; 118) of spindle (63; 63') comprises at least two protrusions (118) or ribs arranged in opposition with respect to a radial direction of the spindle (63; 63').

29. The positioning device according to claim 20, wherein the elastic coupling member (65; 108) rests with at least one section thereof on the positioned member (66) to exert the tilting torque on the body (64; 64'; 64"; 107).

30. The positioning device according to claim 20, wherein the elastic coupling member (65; 108) is attached to the body (64; 64'; 64"; 107) and the positioned member (66) and exerts the torque about an axis being parallel to the spindle (63; 63').

31. The positioning device according to claim 20, wherein the positioned member (66) comprises a groove (96), which the elastic coupling member (65; 108) engages with, the groove (96) preferably having outwardly diverging sidewalls.

32. The positioning device according to claim 20, wherein the elastic coupling member (65; 108) comprises an L-shaped arm (102; 108), the free end of which engages with said groove.

33. The positioning device according to claim 20, wherein the elastic coupling member (65; 108) is integrally formed with the body (64; 64'; 64"; 107).

34. The positioning device according to claim 20, wherein the body (64; 64'; 64"; 107) comprises an opening (88) with thread (89; 105) of the body (64; 64'; 64"; 107) being provided in the opening.

35. The positioning device according to claim 20, wherein the body (64; 64'; 64"; 107) comprises a block (97; 97') and a sleeve (98; 103; 104) arranged in the block (97; 97') and having an inner thread (89; 105) for receiving the spindle (63; 63').

36. The positioning device according to claim 20, wherein thread (105) in the body (64; 64'; 64"; 107) comprise two sections of thread separated by a section (106) having no thread.

37. The positioning, device according to claim 20, wherein a guide (67) is provided for guiding the positioned member (66) along a direction parallel to the spindle (63; 63'), in particular with the guide (67) guiding the body (64; 64'; 64"; 107).

38. The positioning device according to claim 37, wherein the guide (67) secures the body (64; 64'; 64"; 107) against rotation about the spindle (63; 63').

39. The positioning device according to claim 37, wherein the guide (67) comprises a rod and the positioned member (66) comprises an opening (91) receiving the rod.

40. The positioning device according to claim 38, wherein the body (64; 64'; 64"; 107) comprises a recess (99) for receiving the guide (67).

41. The positioning device according to claim 20, further comprising
- a first guide (67) for guiding a first section (90) of the positioned member (66) along a first guiding axis,
- a second guide (68) having a guiding surface (111) extending parallel to the first guiding axis and for guiding a second section (94) of the positioned member (66); and
- a magnet device (109) biasing the second section (94) of the positioned member (66) towards the guiding surface (111) of the second guide (68).

42. A positioning device comprising
a positioned member (66);
- a first guide (67) for guiding a first section (90) of the positioned member (66) along a first guiding axis, wherein the first guide (67) restricts the motion of the positioned member (66) to a motion along the first guiding axis and a pivoting motion about the first guiding axis,
- a second guide (68) having a guiding surface (111) extending parallel to the first guiding axis and for guiding a second section (94) of the positioned member (66);
- a rolling bearing (95) mounted to the second section (94) of the positioned member (66) and comprising an outer member which rolls on the guiding surface (111); and
- a magnet device (109) biasing the second section (94) of the positioned member (66) towards the guiding surface (111) of the second guide (68) to prevent the pivoting motion about the first guiding axis.

43. The positioning device according to claim 42, wherein the magnet device (109) generates a biasing force being inclined with respect to a normal onto the guiding surface (111).

44. The positioning device according to claim 42, wherein the first guide (67) comprises a guiding rod.

45. The positioning device according to claim 42, wherein the positioned member (66) comprises a guiding opening (91) receiving the guiding rod.

46. The positioning device according to claim 42, wherein the magnet device (109) comprises a magnet (109) fastened to the positioned member (66).

47. The positioning device according to claim 42, wherein a soft-magnetic or ferromagnetic armature element (110) is mounted to the second guide (68), with the magnetic device (109) interacting with the armature element (110) and pulling the second section (94) towards the guiding surface (111).

48. The positioning device according to claim 42, wherein the second guide is made of a soft-magnetic or ferromagnetic material, with the magnetic device interacting with the second guide as an armature element and pulling the second section towards the guiding surface.

49. The positioning device according to claim 42, wherein the magnet device comprises a longitudinally extending magnet being mounted fixed relative to the second guide, and the positioned member comprises a soft-magnetic or ferromagnetic section.

50. The positioning device according to claim 42, wherein the magnet device (109) generates a force being inclined relative to a straight line connecting the first and second sections (90, 94) of the positioned member (66).

51. The positioning device according to claim 42, wherein the positioned member (66) is a lens holder.

52. Optical instrument, in particular a surveying instrument, comprising
a positioning device according to claim 1.

53. The optical instrument according to claim 52, the optical instrument comprising
at least one lens (37) coupled to the positioning device.

54. The optical instrument according to claim 52, the optical instrument comprising
an objective (36) and a focusing lens (37), the focusing lens (37) being arranged with respect to the objective (37) to form an optical system for imaging an object and being coupled to the positioning device so that an object imaged by the optical system can be focused.

55. The optical instrument according to claim 52, the optical instrument being a telescope, in particular a telescope for use in a surveying instrument.

56. The optical instrument according to claim 52, the optical instrument being a camera, in particular a camera for use in a surveying instrument.

57. The optical instrument according to claim 52, comprising a alidade, rotatable about a vertical axis, a telescope or a camera, respectively, being mounted to the alidade tiltable about a tilting axis substantially orthogonal to the vertical axis.

58. Optical instrument, in particular a surveying instrument, comprising
a positioning device according to claim 20.

59. Optical instrument, in particular a surveying instrument, comprising
a positioning device according to claim 42.

60. The positioning device according to claim 42, wherein the magnet device (109) generates a force being inclined to a straight line connecting the first (90) and second sections (94) at the positioned member (66) for pulling the second section (94) toward the guiding surface (111) and at the same time biasing the positioned member (66) in a direction orthogonal or inclined to the first guiding axis.

* * * * *